US012401128B2

(12) United States Patent
Garcia Tejero et al.

(10) Patent No.: US 12,401,128 B2
(45) Date of Patent: Aug. 26, 2025

(54) WAVEGUIDE ANTENNA

(71) Applicant: HUBER+SUHNER AG, CH-9100 HERISAU (CH)

(72) Inventors: Alejandro Garcia Tejero, St. Gallen (CH); Jerzy Kowalewski, St. Gallen (CH); Michael Pieper, Röthis (AU); Francesco Merli, St. Gallen (CH)

(73) Assignee: HUBER+SUHNER AG, Herisau (CH)

( * ) Notice: Subject to any disclaimer, the term of this patent is extended or adjusted under 35 U.S.C. 154(b) by 4 days.

(21) Appl. No.: 18/278,884

(22) PCT Filed: Mar. 3, 2022

(86) PCT No.: PCT/EP2022/055418
§ 371 (c)(1),
(2) Date: Aug. 25, 2023

(87) PCT Pub. No.: WO2022/184835
PCT Pub. Date: Sep. 9, 2022

(65) Prior Publication Data

US 2024/0136723 A1 Apr. 25, 2024
US 2024/0235038 A9 Jul. 11, 2024

(30) Foreign Application Priority Data

Mar. 5, 2021 (CH) .................................... 00241/21

(51) Int. Cl.
*H01Q 13/02* (2006.01)
*H01Q 21/00* (2006.01)
*H01Q 21/06* (2006.01)

(52) U.S. Cl.
CPC ..... *H01Q 13/0258* (2013.01); *H01Q 13/0275* (2013.01); *H01Q 21/0006* (2013.01); *H01Q 21/064* (2013.01)

(58) Field of Classification Search
CPC ........... H01Q 13/0258; H01Q 13/0275; H01Q 21/0006; H01Q 21/064; H01Q 1/3233; H01Q 1/523
See application file for complete search history.

(56) References Cited

U.S. PATENT DOCUMENTS 8,390,403 B1 3/2013 Schaffner et al.
9,692,117 B2 6/2017 Iwanaka
(Continued)

FOREIGN PATENT DOCUMENTS

CN 111653855 A 9/2020
EP 1 983 614 B1 8/2016
(Continued)

OTHER PUBLICATIONS

EPO (Rijswijk, NL), English language version of the International Search Report, Form PCT/ISA/210, for International Application PCT/EP2022/055418, Jun. 22, 2022 (3 pages).
(Continued)

*Primary Examiner* — Hoang V Nguyen
(74) *Attorney, Agent, or Firm* — Pauley Erickson & Swanson

(57) ABSTRACT

A waveguide antenna with an antenna proximal side and an antenna distal side. A number of waveguide openings for transmitting and/or receiving electromagnetic signals to and/or from an environmental space is arranged at the antenna distal side. The waveguide antenna includes an antenna interface structure that includes interface waveguide apertures arranged in an interface carrying surface that extends transverse to a normal axis. Each interface waveguide aperture is coupled with at least one associated waveguide opening such that the respective interface waveguide aperture and the associated waveguide opening(s) are offset with respect to each other transverse to the normal axis. Each interface waveguide aperture and at least one
(Continued)

coupled waveguide opening are configured for transmitting and/or receiving electromagnetic signals with respective polarizations rotated against each other. At least two neighboring interface waveguide apertures may be interlaced with each other, and/or the interface waveguide apertures may in each case enable a simultaneous and/or alternative transferring of at least two electromagnetic signals of different polarization, and/or the interface waveguide apertures may have different aperture orientations.

20 Claims, 13 Drawing Sheets

(56) References Cited

U.S. PATENT DOCUMENTS

| | | | | |
|---|---|---|---|---|
| 9,812,784 | B2 | 11/2017 | Park et al. | |
| 10,218,075 | B1 | 2/2019 | Smith | |
| 10,658,761 | B2 * | 5/2020 | Hügel | H01P 1/2005 |
| 2010/0060537 | A1 | 3/2010 | Nagayama | |
| 2010/0259346 | A1 | 10/2010 | Runyon | |
| 2011/0234466 | A1 * | 9/2011 | Yamada | H01Q 13/06 343/786 |
| 2012/0321246 | A1 | 12/2012 | Pomerene et al. | |
| 2017/0271776 | A1 | 9/2017 | Biancotto et al. | |
| 2020/0006863 | A1 * | 1/2020 | Fleancu | H01Q 25/001 |
| 2020/0059000 | A1 | 2/2020 | Kamo et al. | |
| 2020/0091621 | A1 | 3/2020 | Huang et al. | |
| 2020/0127358 | A1 | 4/2020 | de Rijk et al. | |
| 2020/0365976 | A1 | 11/2020 | Izadian | |
| 2020/0400815 | A1 | 12/2020 | Wintermantel | |
| 2021/0028527 | A1 | 1/2021 | Doyle et al. | |
| 2021/0028549 | A1 | 1/2021 | Doyle et al. | |

FOREIGN PATENT DOCUMENTS

| | | | |
|---|---|---|---|
| EP | 2 676 327 | B1 | 7/2018 |
| EP | 3 430 685 | B1 | 5/2020 |
| JP | 5616927 | B2 | 10/2014 |
| WO | WO 2017/167916 | A1 | 10/2017 |
| WO | WO 2018/001921 | A1 | 1/2018 |
| WO | WO 2020/188093 | A1 | 9/2020 |
| WO | WO 2020/2008833 | A1 | 10/2020 |
| WO | WO 2020/231905 | A1 | 11/2020 |
| WO | WO 2021/016216 | A1 | 1/2021 |
| WO | WO 2021/016218 | A1 | 1/2021 |
| WO | WO 2022/122319 | A1 | 6/2022 |

OTHER PUBLICATIONS

Le Sage, G. P., "3D Printed Waveguide Slot Array Antennas," in IEEE Access, 2016, vol. 4, pp. 1258-1265—doi: 10.1109/ACCESS.2016.2544278 (8 pages).
Huber+Suhner AG, "An Antenna concept that Addresses the Challenges with Automotive Radar," IWPC 2016, Trends in Automotive Radar and Impact on System Architecture, Mar. 15, 2016, Munich, Germany, AUDI (11 pages).
Huber+Suhner AG, "Injection Molded Radar Antennas," IWPC 2018, New Features for Automotive Radars, Feb. 1, 2018, Stuttgart, Germany, Daimier (15 pages).
Mallahzadeh, A.R., et al., "An Ultralow Cross-Polarization Slot Array Antenna in Narrow Wall of Angled Ridge Waveguide," J. of Comm Eng, 2012, Autumn, vol. 1, No. 1 (14 pages).

* cited by examiner

Fig. 19a
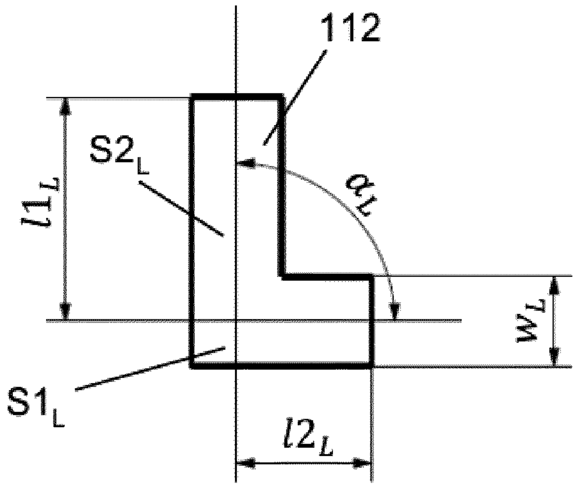
Fig. 19b
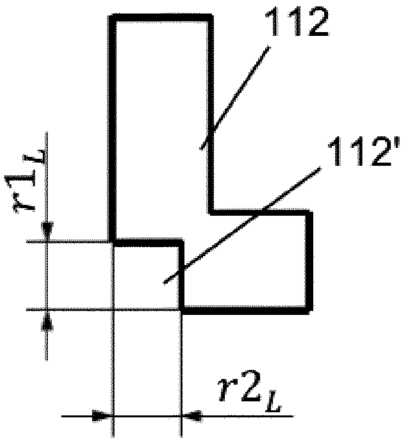
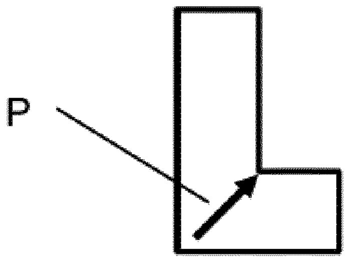
Fig. 19c

WAVEGUIDE ANTENNA

CROSS REFERENCE TO RELATED APPLICATION

This application is a National Phase filing in the United States, under 35 USC § 371, of PCT International Patent Application PCT/EP2022/055418, filed on 3 Mar. 2022 which claims the priority of Swiss Patent Application CH 00241/21, filed 5 Mar. 2021.

The above-referenced applications are hereby incorporated by reference herein in their entirety and are made a part hereof, including but not limited to those portions which specifically appear hereinafter.

FIELD OF THE INVENTION

The present disclosure lies in the field of waveguide antennas and waveguide antenna assemblies. The disclosure may be used, among others, in the field of automotive radar systems.

BACKGROUND OF THE INVENTION

Waveguide based high-frequency systems are used in a large variety of applications, many of them including waveguide antennas, in particular multichannel antennas. Such waveguide antennas need to be electromagnetically coupled with further components and circuitry, such as printed circuit boards (PCBs) and semiconductor components. The requirements regarding performance, cost efficiency and miniaturization are continuously increasing.

SUMMARY OF THE INVENTION

The before-mentioned requirements, however, are mutually contradictory, at least in part. In particular, the need for high isolation respectively electromagnetic decoupling between the signals respectively signal channels and the need for miniaturization are contradictory.

It is an overall objective of the present disclosure to improve the state of the art regarding waveguide antennas and assemblies and favorably avoid some or more problems of existing solutions in full or in part. In particular embodiments, one or more of the following advantages may be achieved: The area required for the antenna ports may be reduced respectively minimized, thus minimizing the overall size of the antenna interface. Further, the interface between waveguide antennas and connected electronic components, in particular semiconductor components is simplified and the overall number of waveguide interfaces is reduced. Further, the electromagnetic isolation respective decoupling may be improved. Further, the data volume that may be transferred between waveguide antenna and circuitry may be increased. Further, the antenna costs may be reduced.

In an aspect, the overall objective is achieved by a waveguide antenna having at least two signal channels. The waveguide antenna has an antenna distal side and an antenna proximal side. A number of waveguide openings for transmitting electromagnetic signals to and/or receiving electromagnetic signals from an environmental space is arranged at the antenna distal side.

The expression "signal channel" refers to functionally distinct electromagnetic signal paths of the waveguide antenna between waveguide openings at the antenna distal side and interface waveguide apertures at the antenna proximal side, with each signal channel corresponding to one signal path. In typical embodiments, the waveguide antenna is a multichannel antenna with a number of more than two signal channels.

Within the waveguide antenna, the electromagnetic waves respectively electromagnetic signals generally progress from proximal towards distal for signals that are to be transmitted by the waveguide antenna and from distal towards proximal for signals that are received by the waveguide antenna. In typical embodiments, all waveguide openings may have an identical contour respectively design and/or geometry.

The waveguide antenna further includes an antenna interface structure for connecting the waveguide antenna to a printed circuit board and/or a semiconductor component, the antenna interface structure being arranged at the antenna proximal side. The antenna interface structure includes a number of interface waveguide apertures. The interface waveguide apertures are arranged in an interface carrying surface and are coupled with the waveguide openings via a waveguide channel structure which is arranged within the antenna. The coupling via a waveguide channel structure does not necessarily imply that each interface waveguide aperture would be coupled with each waveguide opening.

The interface carrying surface extends transverse to a normal axis, the normal axis extending between proximal and distal. In a typical design, the antenna distal side and the antenna proximal side, in particular the interface carrying surface, are generally parallel and the antenna distal side is offset in distal direction with respect to the antenna proximal side.

Each interface waveguide aperture is coupled with at least one associated waveguide opening such that the respective interface waveguide aperture and the associated at least one waveguide opening are offset with respect to each other transverse to the normal axis. The normal axis may generally be any axis that extends transverse to the interface carrying surface, for example, but not necessary, a central axis of the waveguide antenna. A direction transverse to the normal axis can be referred to as lateral.

In an embodiment where each interface waveguide aperture is coupled with a group of associated waveguide openings as discussed in more detail below, one, some or all waveguide openings of the group of waveguide openings may be offset with respect to the respective interface waveguide aperture. The expression "offset with respect to each other transverse to the normal axis" refers to the respective interface waveguide aperture and waveguide opening not being aligned with each other. Typically, the contours of the respective interface waveguide aperture and waveguide opening do not overlap in a viewing direction along the normal axis. In dependence of the design, however, some overlap may be present.

The number of waveguide openings and the number of interface waveguide apertures is at least two in each case. In an embodiment where the number of interface waveguide apertures corresponds to the number of waveguide openings, the interface waveguide apertures may in each case be coupled with an associated waveguide opening in a one-to-one manner. Typically, however, the number of waveguide openings is larger than the number of interface waveguide apertures. By way of example, the number of waveguide openings may be a multifold respectively n-fold of the number of interface waveguide apertures. The number of separate signal channels via which the waveguide antenna is in an operational configuration coupled to further circuitry, in particular one or more semiconductor components, corresponds to the number of interface waveguide apertures.

Typical values for the number of interface waveguide apertures respectively signal channels are 2, 4, 6, 7, 8, 12, 16, 20, 24, 28, 32, 36, 48, 64, 96.

In an embodiment where the number of waveguide openings is an n-fold of the number of interface waveguide apertures, each of the interface waveguide openings may be coupled via the waveguide channel structure with a group of waveguide openings, the group of waveguide openings being a subset of the number of waveguide openings of the waveguide antenna. In such embodiment, each interface waveguide aperture is accordingly associated and coupled with each waveguide opening of the group of waveguide openings, while each waveguide opening is associated and coupled with one interface waveguide aperture. The number of interface waveguide apertures generally defines the number of signal channels as mentioned before. Each interface waveguide aperture and the associated waveguide opening or group of waveguide openings are generally coupled by curved respectively non-straight waveguide channels of the waveguide channel structure. It should further be noted that the waveguide antenna may optionally include further interface waveguide apertures that are arranged in the interface carrying surface in a different manner and do not form part of the number of interface waveguide apertures as discussed here.

Each interface waveguide aperture and at least one thereto coupled waveguide opening are configured for transmitting and/or receiving electromagnetic signals with respective polarizations rotated against each other, for example by 90 degrees. Other larger or smaller angles, however, may be used as well. In an embodiment where each interface waveguide aperture is coupled with a group of associated waveguide openings, each interface waveguide aperture may be configured for transmitting and/or receiving electromagnetic signals with a first polarization, and each of the thereto coupled waveguide openings are configured for transmitting and/or receiving electromagnetic signals with a polarization that is different from the first polarization, for example a common second polarization.

Interface waveguide apertures and waveguide openings being configured for transmitting and/or receiving respectively for transferring electromagnetic signals with polarizations rotated against each other may be achieved by the respective interface waveguide apertures and waveguide openings being rotated against each other by an angle that corresponds to the relative rotation of the polarization.

The interface waveguide apertures may be designed and arranged such that at least two neighboring interface waveguide apertures are interlaced with each other. Alternatively, or additionally, the interface waveguide apertures are in each case designed to enable a simultaneous and/or alternative transferring of both of a first electromagnetic signal and second electromagnetic signal, wherein the first and second electromagnetic signals have different polarizations, respectively of at least two electromagnetic signals of different polarization. Alternatively, or additionally, the interface waveguide apertures are arranged such that at least two neighboring interface waveguide apertures have different aperture orientations.

The waveguide antenna as well as further elements and circuitry as described further below may be designed for typical operational frequencies in a range of, e. g. 6 GHz to 300 GHz or a subrange thereof, for example 11.9 GHz to 18.0 GHz (Ku band), 26.3 GHz to −40.0 GHz (Ka band), 49.0 GHz to 75.8 GHz (V band), 60.5 to 91.9 GHz (E band), 73.8 GHz to 112 GHz (W band), 113 GHz to 173 GHz (D band). Further exemplary frequency ranges may be 57 GHz to 66 GHz, 76 GHz to 81 GHz, or 135 GHz to 150 GHz.

The antenna distal side is the side of the waveguide antenna at which, in operation, electromagnetic signals may be transmitted into an environmental space and/or received from the environmental space, e.g., air. The antenna proximal side is a side of the waveguide antenna at which the waveguide antenna is connected respectively mounted to further components and/or circuitry, in particular a printed circuit board (PCB) and/or one or more semiconductor component(s) as explained further below. Apart from the waveguide openings, the antenna distal side may typically be generally planar respectively even, with a planar respectively even antenna distal surface. However, the antenna distal surface may also be curved, e.g., to match the contour of another element, e. g. in a vehicle. Also, the antenna proximal side may generally be planar respectively flat in particular in the area of the antenna interface structure. A surface being planar respectively flat does not exclude the presence of apertures, recesses and/or corrugations and/or protrusions. The interface carrying surface may be the antenna proximal surface or be part of the antenna proximal surface. It is noted that the antenna proximal side not necessarily formed by a single continuous surface, but may, for example be stepped. In particular, the antenna interface structure may project in proximal direction beyond further parts of the antenna proximal side which may be set back in distal direction.

The overall shape of the waveguide antenna may be generally plate- or box shaped, with the antenna proximal side and the antenna distal side being generally parallel to each other. In other designs, however, the antenna proximal side and the antenna distal side may be somewhat angled with respect to each other. Generally, the antenna proximal side and the antenna distal side are spaced apart with respect to each other. In an embodiment, the waveguide antenna is made from metallized plastics, in particular injection molded plastics. A manufacture from injection-molded plastics is favorable in view of cost efficient manufacture with established and proven technology. Other advanced technologies, such as metal diecasting, 3D-printing or stereo lithography may be used as well. In principle, the waveguide antenna may also be made fully or partly by way of machining from metal.

In dependence of the overall design, the waveguide antenna may be made from a single piece of material. Typically, however, the waveguide antenna is made from a number of elements. In an embodiment, the waveguide antenna is made from a stack of layers, with the individual layers having in each case a proximal layer side and a thereto distal layer side. A waveguide antenna of this design generally has a most distal layer, optionally one or more intermediate layers, and a most proximal layer. The single layers respectively their proximal and distal layer side generally extend transverse to the normal axis. The waveguide openings are arranged in the most distal layer and the antenna interface structure is arranged in the most proximal layer. The waveguide channel structure realizes a waveguide guiding and/or distribution network. Such waveguide guiding and/or distribution network may be formed by waveguide channels and/or corrugations of the most distal layer, the most proximal layer and/or one or more intermediate layers as generally known in the art. Typically, all layers are fully or partly metalized or formed from a metallic respectively conductive material and have the same size or footprint. Other designs, however, may be used as well. Where made from plastics respectively per se non-conductive material, the outer surfaces of the waveguide antenna respective their layers as well as the walls of the waveguide channel structure are generally metalized fully or partly respectively selectively.

Some or all or layers of the waveguide antenna may be permanently connected during manufacture, e.g., by bonding, gluing, clamping, soldering, riveting, etc. Alternatively, or additionally, however, some or all elements may be structurally separate respectively distinct. In particular, the antenna interface structure may be realized as a dedicated component, e.g., as an interface adapter.

As mentioned before, it is noted that the number of waveguide openings does generally not correspond to the number of interface waveguide apertures, but is generally different and in particular larger due to the waveguide channel structure and in particular a distribution network within the waveguide antenna being branched.

In an embodiment, the interface waveguide apertures are arranged in a pattern of rows and/or columns and in particular in a pattern of rows and columns. The interface waveguide apertures being arranged in a pattern of rows or columns does not exclude an interlacing between neighboring interface waveguide apertures as explained further below. The rows and columns are generally mutually perpendicular, with the rows respectively the columns being parallel among each other. Such arrangement of the rows and columns is assumed where not stated differently. In some embodiments, however, the rows and columns may intersect in a non-perpendicular manner and/or intersect between different rows and/or columns with different angles. Each row and each column is generally defined by a line in the interface carrying surface. The position of each interface waveguide aperture is generally defined by one of the rows and one of the columns. The lines defining the rows and columns may run through a given reference point, typically but not necessarily the geometric center or edge of the interface waveguide apertures. While typically being the case, the distance between neighboring rows is not necessarily identical to the distance between neighboring columns. Also, the distance between the columns and/the rows is typically identical for all rows respectively all columns, but may in principle also vary among the rows and/or among the columns.

In a particular embodiment where the interface waveguide apertures are arranged in a pattern of rows and/or columns, the number of interface waveguide apertures may be arranged such that all neighboring interface waveguide apertures within at least one row and/or column and in particular within each row and/or within each column are interlaced with each other.

In a particular embodiment where the interface waveguide apertures are arranged in a pattern of rows and/or columns, the number of interface waveguide apertures may be arranged such that all neighboring interface waveguide apertures within at least one row and/or column and in particular within each row and/or each column have different aperture orientations.

The design of a waveguide antenna in accordance with the present disclosure has a number of advantages that may be realized alone or in combination in dependence of the specific design.

By arranging the interface waveguide apertures in an interlaced manner as explained before, the overall area that is occupied by a given number of interface waveguide apertures is reduced, thereby minimizing the space consumption respectively increasing the number of interface waveguide apertures per area. Special designs of the interface waveguide apertures respectively their contour as explained further below are particularly favorable regarding interlacing with neighboring interface waveguide apertures being arranged close to each other.

Designing the interface waveguide apertures to enable in each case a transferring of signals of different polarizations, for example both a first electromagnetic signal and second electromagnetic signal of different polarizations, allows to enhance the electromagnetic decoupling respectively isolation since electromagnetic signals may be transferred via neighboring signal channels respectively interface waveguide apertures with different polarizations, thereby avoiding or at least reducing interferences. Alternatively, such design may be used to simultaneous transfer signals of two polarizations simultaneously via the same signal channel respectively interface waveguide aperture. Thereby, the required number of signal channels respectively interface waveguide apertures may be halved, respectively the data amount that may be transmitted via a given number of signal channels may be doubled.

Both an interlacing as well as a transfer of electromagnetic signals with different orientations rely in a particular design and in particular contour of the interface waveguide apertures as well as a corresponding cross section of the thereto-connected waveguide channels as discussed further below.

Arranging the interface waveguide apertures such that neighboring interface waveguide apertures have different aperture orientations enhances the electromagnetic decoupling respectively isolation even if the polarization is generally identical with respect to the wave guide aperture. In this context, it should be remembered that the design of a waveguide channel or a waveguide aperture generally determines the polarization of the electromagnetic waves respectively signals that may be transmitted. Different orientations of neighboring waveguide apertures accordingly cause corresponding different polarizations of the electromagnetic signals. The expression “orientation” refers to a rotational orientation of the interface waveguide apertures in the interface carrying surface, in particular in a viewing direction transverse to the interface carrying surface respectively the axis of the interface waveguide apertures.

In another aspect, the overall objective is achieved by an antenna waveguide assembly. The waveguide antenna assembly includes a wave-guide antenna according to any embodiment as discussed above and/or further below. The waveguide antenna assembly further includes a printed circuit board, the printed circuit board having a printed circuit board proximal side and a printed circuit board distal side, wherein the waveguide antenna is mounted on the printed circuit board distal side. It is noted that the expression “waveguide antenna” refers to the structure of the antenna as such without PCB, while an assembly of waveguide antenna and thereto connected PCB is referred to as “antenna waveguide assembly”. The PCB also extends generally transverse to the normal axis.

The printed circuit board (PCB) may be designed as generally known in the art in particular in high-frequency applications. It is generally plate shaped, with the PCB distal side and the PCB proximal side being parallel to each other. The PCB is typically realized by a sandwich of a number of insulating and metallic layers, wherein the metallic layers may be structured to form conduits. The outermost layers, namely a layer at the PCB proximal side and the PCB distal side that form the outer surfaces are generally metalized respectively metal layers. Electronic components, such as semiconductor components, may be generally arranged on either or both of the PCB proximal side and the PCB distal side.

In another aspect, the overall objective is achieved by the use of a waveguide or a waveguide antenna assembly according to any embodiment as discussed above and/or further below in an automotive radar system. The automotive radar system may be either or both of a long range (up to 500 m), mid-range (up to 300 m) or a short range (up to 250 m) automotive radar. It is noted, however, that the present disclosure is not limited to this particular application. The waveguide antenna and/or waveguide antenna assembly may be designed for operation in either or more of the before-mentioned frequency ranges.

In an embodiment, the interface waveguide apertures have in each case a Y-shaped, Z-shaped, L-shaped, ridged-L-shaped, S-shaped or N-shaped contour. All of these designs have the favorable property of allowing an interlaced arrangement of the interface waveguide apertures. The expression "contour" refers to the circumferential or closed edge line of an aperture or opening, and in particular of the interface waveguide apertures, in particular in a viewing direction transverse to the respective surface, in particular the interface carrying surface. It is noted that a viewing direction transverse to the interface carrying surface corresponds to a direction along respectively in alignment with the normal axis. Further, dependent on the specific design and dimensioning, some contours allow a single polarization or different polarizations. This aspect is discussed further below in more detailed in the context of exemplary embodiments and with reference to the figures.

An interlaced arrangement of the interface waveguide apertures or of apertures in general is generally possible if their contours have concave and convex features, such that concave and convex features of neighbouring apertures may mutually engage. The interface waveguide apertures, however, are distinct and separate from each other.

It is to be understood each interface waveguide aperture is an opening of an associated waveguide channel of the waveguide antenna, the waveguide channel being typically part of or coupled to a waveguide guiding and/or distribution network of the waveguide antenna as mentioned before. At least in a proximal end section that opens into the interface waveguide aperture, the waveguide channels have in each case a cross section that corresponds to the contour of the interface waveguide aperture. The cross-section of the waveguide channel may be uniform or merge into another cross section within the waveguide channel.

In an embodiment, the interface waveguide apertures have in each case an identical contour, i.e., the contour is identical for all interface waveguide apertures. In other embodiments, however, two or more different contours may be used.

In a particular embodiment where the interface waveguide apertures are arranged in a pattern of rows and/or columns, the interface waveguide apertures within a row and/or within a column have in each case an identical aperture orientation.

In an embodiment, the interface waveguide apertures have in each case either of a first aperture orientation or a second aperture orientation different from the first aperture orientation, wherein interface waveguide apertures having the first aperture orientation are arranged with interface apertures having the second aperture orientation in an alternating manner. The alternating arrangement may be along one or two given directions within the interface carrying surface. In a particular embodiment, interface waveguide apertures having the first aperture orientation are arranged with interface apertures having the second aperture orientation in an alternating manner within each row and/or column.

If, in an arrangement in rows and columns, neighboring interface waveguide apertures have alternating orientations both within each row and within each column, each interface waveguide aperture having the first aperture orientation is in the direction of the rows as well as the columns, i.e., in two mutually transverse directions, surrounded by four interface waveguide apertures having the second aperture orientation, and vice versa, while further interface waveguide apertures of the same orientation are present only in the diagonal directions. This kind of design is particularly favorable regarding the electromagnetic decoupling respectively isolation.

In an embodiment, the antenna interface structure includes an electromagnetic band gap (EBG) structure, the electromagnetic band gap structure projecting from the interface carrying surface. The EBG structure may in particular be arranged at the antenna proximal side and project from the interface carrying surface in proximal direction and away from the antenna distal side. The EBG structure may generally be designed as known in the art and includes an arrangement of pin-respectively pillar-, post- and/or protrusions. Providing an EBG structure enhances the electromagnetic decoupling respectively isolation. The EBG elements are arranged in the areas in between the interface waveguide apertures. In particular designs, the EBG structure is realized as a periodic pattern of two or more differently shaped EBG element types. Generally, all EBG elements of the antenna interface structure are of the same height respectively project from the interface carrying surface by the same distance.

It is noted that a design of the waveguide antenna that includes an EBG structure as mentioned before implies that the antenna interface structure and accordingly the antenna proximal side is, as a hole, not flat respectively planar, but is structured, e.g., corrugated respectively recessed, with the EBG elements projecting in proximal direction from the generally flat respectively planar interface carrying surface. Such design is suited for connecting to a flat respectively planar PCB. In further designs as discussed below, the printed circuit board to which the waveguide antenna may connected includes a printed circuit board EBG structure, in particular with mushroom-shaped EBG elements. In such embodiments, the interface carrying surface directly forms the proximal side of the waveguide antenna or a part thereof and is accordingly flat respectively planar.

In an embodiment, the waveguide antenna further includes a number of orthomode transducers. The orthomode transducers are electromagnetically arranged between the waveguide openings and the interface waveguide apertures. In a particular embodiment, an orthomode transducer of the number of orthomode transducers is associated and electromagnetically coupled with an associated interface waveguide aperture in a one-to-one manner. Especially an orthomode transducer may be provided for each interface waveguide aperture and a respective orthomode transducer is associated and electromagnetically coupled with each of the interface waveguide apertures in a one-to-one manner. In further designs, the number of orthomode transducers does not match the number of interface wave guide apertures. In particular, a number of more than one interface waveguide apertures may be electromagnetically coupled with an orthomode transducers. Further, one and the same interface waveguide aperture may be electromagnetically coupled with two or more orthomode transducers.

Orthomode transducers are generally known waveguide components respectively waveguide structures for combining two electromagnetic waves respectively signals of mutually orthogonal polarization or for splitting an electromagnetic signal into two mutually orthogonal signals. In the context of the present disclosure, orthomode transducers may be provided for simultaneous transfer of two electromagnetic signals of different polarization via the interface waveguide apertures.

In an embodiment of a waveguide antenna assembly, the printed circuit board (PCB) includes an interface structure with a number of PCB waveguide passages, the PCB waveguide passages each extending through the PCB between the PCB proximal side and the PCB distal side. Further, the PCB waveguide passages are in in each case aligned with a respective interface waveguide aperture. Thereby, an electromagnetic signal transfer between respectively via each PCB waveguide passage and an interface waveguide aperture is enabled. In such embodiment, one or more electronic components, such as one or more semiconductor components respectively integrated circuits (ICs) may couple with the waveguide antenna via respectively trough the PCB via the PCB waveguide passages.

In a particular embodiment, the number of PCB waveguide passages corresponds to the number of interface waveguide apertures and each interface waveguide aperture is associated with a respective PCB waveguide passage in a one-to-one manner.

In a particular embodiment, each PCB waveguide passage has a cross section that is different from the contour of the associated interface waveguide aperture. The cross section of the PCB waveguide passage may differ from the contour of the associated interface waveguide aperture regarding the shape and/or dimensions. In particular, for a complex contour of the interface waveguide aperture, the cross section of the PCB waveguide passages may be simpler and accordingly easer regarding manufacture. A centre of an interface waveguide aperture and associated PCB waveguide opening, however, are favourably aligned with each other. In alternative embodiments, however, the contour of the interface waveguide aperture and the associated PCB waveguide passage are identical and in particular substantially congruent. In a typical design, all PCB waveguide openings are of identical design.

In an embodiment of a waveguide antenna assembly, the waveguide antenna assembly further includes a semiconductor component, the semiconductor component being mounted on the printed circuit board proximal side. The semiconductor component includes a number of electromagnetic signal launchers. The number of electromagnetic signal launchers corresponds to the number of PCB waveguide passages. The PCB passages are in in each case aligned with a respective electromagnetic signal launcher in a one-to-one manner. The semiconductor component may in particular be an integrated circuit (IC).

The electromagnetic signal launchers are generally arranged at the PCB-facing side of the semiconductor component. Since each signal launcher is associated and aligned with a respective PCB waveguide passage and each PCB waveguide passage is in turn aligned with an associated interface waveguide aperture in a one-to-one manner, each electromagnetic signal launcher is also aligned with an associated interface wave guide aperture of the waveguide antenna in a one-to-one manner and can exchange electromagnetic signals therewith via respectively through the respective PCB waveguide passage.

In a further embodiment of a waveguide antenna assembly, the PCB includes a PCB coupling cut-out. The PCB coupling cut-out extends between and opens into the PCB distal side and the PCB proximal side. The PCB coupling cut-outs are accordingly through-going holes. The antenna interface structure projects for this kind of embodiment into or through the printed circuit board coupling cut-out from the printed circuit board distal side towards the printed circuit board proximal side. In a viewing direction transverse to the normal axis, the interface waveguide apertures are arranged within the contour that delimited by the PCB coupling cut-out.

Rather than providing a single PCB waveguide passage for each electromagnetic signal launcher and associated interface waveguide aperture, only a single printed circuit board coupling cut-out is required for this kind of embodiment. Thereby, the design and assembly complexity are generally decreased the signal transmission performance is increased due to the number of electromagnetic interfaces in the signal path.

In a particular embodiment with a PCB coupling cut-out, the waveguide antenna assembly further includes a semiconductor component, the semiconductor component being mounted on the printed circuit board proximal side. The semiconductor component includes a number of electromagnetic signal launchers. The number of electromagnetic signal launchers corresponds to the number of interface waveguide apertures. The interface waveguide apertures are in in each case aligned with a respective electromagnetic signal launcher in a one-to-one manner. For this type of embodiment, no separate PCB waveguide passage is present for the single signal launchers respectively interface waveguide apertures. Instead, the antenna interface structure projects into or through the PCB coupling cut-out from the proximal side. For this type of design, the antenna interface structure and in particular the interface carrying surface may project in proximal direction beyond further surrounding parts of the antenna proximal side respectively antenna proximal surface.

In a particular design, the antenna interface structure directly contacts the semiconductor component. In embodiments where the antenna interface structure includes an EBG structure as explained before, the proximal side of the EBG structure may contact the semiconductor component. In embodiments of the waveguide antenna where the antenna interface structure does not include an EBG structure, the interface-aperture carrying surface may contact the semiconductor component.

While being advantageous in a number of aspects, a PCB coupling cut-out as explained before has the general disadvantage that the solder ball grid that may otherwise be arranged the electromagnetic signal launchers is not present, thereby reducing the electromagnetic isolation respectively decoupling. This drawback, however, may be overcome fully or partly by a number of measures that may be used alone or in combination.

In an embodiment, the antenna interface structure and the semiconductor component may be coupled via a layer of conductive adhesive, the layer of conductive adhesive being arranged between the antenna interface structure and the semiconductor component. By the adhesive layer, the electromagnetic isolation is increased.

In a particular embodiment, a printed circuit board electromagnetic band gab structure (PCB EBG structure, in particular an EBG structure having mushroom-shaped electromagnetic band gap elements, is arranged on and/or within the PCB. The PCB EBG structure may for example extend from either or both of the PCB proximal side and/or the PCB distal side into respectively through the body of the PCB and be arranged in between respectively around the PCB waveguide passages, thereby improving the electromagnetic isolation respectively decoupling. Alternatively, or additionally, the PCB EBG structure may be arranged on the PCB distal side and project towards the interface carrying surface of the waveguide antenna (antenna proximal side) respectively be arranged between the PCB distal side and the antenna proximal side in addition or alternatively to an EBG structure of the waveguide antenna as explained before.

In an embodiment, the waveguide antenna includes an antenna-sided mounting structure that is arranged at the antenna proximal side. Similarly, the PCB may include a PCB-sided mounting structure, with the antenna-sided mounting structure and the PCB-sided mounting structure being configured and arranged to mechanically interact, in particular by way of engagement. By way of example, the antenna-sided mounting structure may include mounting posts that project beyond the general antenna proximal surface and in particular the antenna interface structure in proximal direction. The PCB-sided mounting structure may be formed by corresponding through-going mounting cut-outs. In a variant, the antenna-sided mounting structure may include resilient snap elements.

In further embodiments, the antenna-sided mounting structure may be configured and arranged to directly mechanically interact with a housing of the semiconductor component on the PCB. By way of example, the antenna-sided mounting structure may include resoling elements, such as resilient hooks, that engage with the circumference of the housing of the semiconductor component via corresponding cut-outs of the PCB. In a further design, the antenna-sided mounting structure may include a rim that fully or partly surrounds respectively delimits the antenna interface structure and in particular the interface waveguide apertures thereof and circumferentially surrounds and contacts the housing of the semiconductor component on at least part of its circumference. In a further design, the housing of the semiconductor component includes a coupling structure, e.g., in form of recesses or depressions that is configured and arranged for engagement with the antenna-sided mounting structure.

It is noted that a number of more than one semiconductor components, for example 2, 4, or 8 semiconductors may be arranged on the oriented circuit board, for example in a side-by-side arrangement and may be connected to the same waveguide antenna in any of the before-discussed ways. In such embodiment, the waveguide antenna may have a single common interface structure, or separate interface structures may be for seen for some or all of the semiconductor components.

DESCRIPTION OF THE DRAWINGS

The herein described disclosure will be more fully understood from the detailed description given herein below and the accompanying figures which should not be considered limiting to the disclosure described in the appended claims. The figures show

FIG. 19*a* shows an L-shaped contour of an interface waveguide aperture;

FIG. 19*b* shows a ridged-L-shaped contour of an interface waveguide aperture;

FIG. 19*c* shows a polarization of the E-field vector for the interface waveguide aperture pursuant to FIG. 19*a* or FIG. 19*b;*

DETAILED DESCRIPTION OF THE INVENTION

Figure 1:
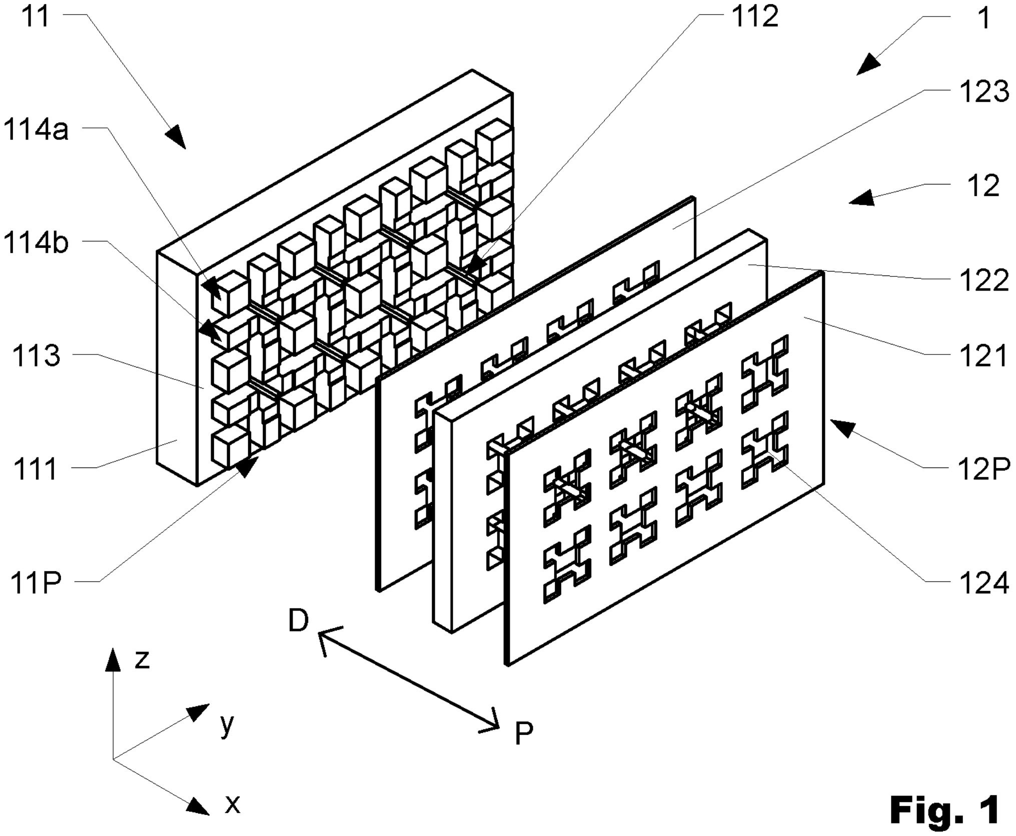
FIG. 1 shows an embodiment of a waveguide antenna assembly in a first exploded view.
Figure 2:
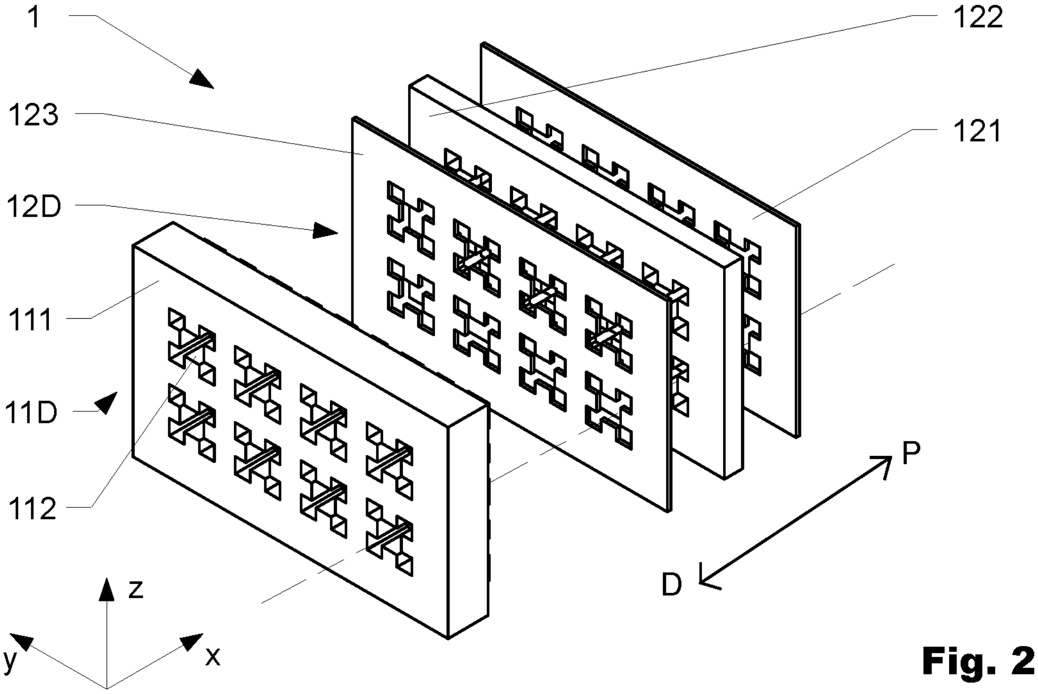
FIG. 2 shows the waveguide antenna assembly of FIG. 1 in a second exploded view.
Figure 3:
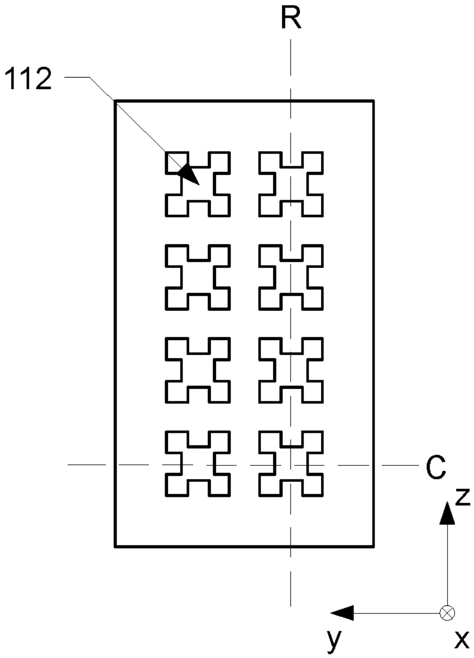
FIG. 3 shows a view from distal towards proximal on the antenna interface structure for the waveguide antenna assembly of FIG. 1.

In the following, reference is first made to FIGS. 1, 2, 3, showing an embodiment of a waveguide antenna assembly 1 in accordance with the present disclosure in two different exploded vies (FIGS. 1, 2) as well as in a view from distal towards proximal (x-direction) of the antenna interface structure (FIG. 3).

The waveguide antenna assembly 1 includes a waveguide antenna 11 and a printed circuit board (PCB) 12. Both of the waveguide antenna 11 and the PCB 12 have a respective proximal side and a respective distal side. For the PCB 12, the PCB proximal side and PCB distal side are referenced 12P, 12D. For the waveguide antenna 11, only a proximal portion with the proximal side 11P is visible in the figures. The waveguide antenna 11 generally continues in distal direction. The directions proximal and Distal are indicated with "P" and "D", respectively. The direction from proximal towards distal is the −x-direction). It is noted that other conventions could be used as well.

The waveguide antenna 11 is typically realized by a stack of layers are arranged on top of the other and may be realized from metalized injection molded plastics and/or other materials and technologies as mentioned above in the general description. From the waveguide antenna 11, only a most proximal layer is shown which realizes the antenna interface structure 111. The proximal side (pointing towards the PCB 12 respectively in the x-direction) of the waveguide antenna 11 is in this design formed by the interface carrying surface 113.

The antenna interface structure 111 includes in this embodiment a number equally shaped interface waveguide apertures 112 that form proximal openings of corresponding waveguide channels which extend from the interface waveguide apertures 112 into the waveguide antenna 11 in generally distal direction. As best visible in FIG. 3, the interface waveguide apertures 112 are arranged as a matrix respectively a pattern of mutually orthogonal and equidistant rows R (z-direction) and columns C (y-direction). In this embodiment, the interface waveguide apertures 112 each have a contour that includes a central part which merges in the four corners into four peripheral parts. This contour enables the transition of electromagnetic waveguides respectively electromagnetic signals with two mutually orthogonal polarizations. In the shown embodiment, the interface waveguide apertures 112 are arranged side by side, without neighboring interface waveguide apertures respectively their contours being interlaced. It is noted that at least proximal end sections of the waveguide channels have in each case a cross section that corresponds to the contour of the interface waveguide apertures 112.

The PCB 12 is realized by a stack of layers as generally known in the art. The PCB 12 includes a most proximal metallic layer 121, a most distal metallic layer 123 on which the waveguide antenna 11 is mounted, and a body respectively a stack of intermediate layers 122 between the most proximal layer 121 and the most distal layer 123. The PCB 12 comprises a number of through-going PCB waveguide passages 124 corresponding to and in alignment with the interface waveguide apertures 112.

The normal axis of the waveguide antenna may be any axis that is aligned with respectively extends parallel to the x-axis.

It is to be understood that the shown number of two rows and four columns is merely exemplary and for the purpose of illustration.

In this embodiment, the antenna interface structure 111 includes an EBG structure that projects from the interface carrying surface 113 towards the PCB 12. The EBG structure includes in this embodiment two types of EBG elements, 114*a*, 114*b* in a periodic arrangement. The EBG structure is arranged in between respectively around the interface waveguide apertures 112.

In the following, reference is additionally made to FIG. 4, in a view corresponding to FIG. 3, i.e., in a view on the interface-carrying surface 111 from distal towards proximal as discussed above. Like for further embodiments, only this view is shown. The overall design generally corresponds to the embodiment of FIGS. 1, 2, 3. In particular, the PCB waveguide passages 124 are in each case shaped and designed to have an identical respective substantially identical contour as the interface waveguide apertures 112 and are aligned with the latter in a one-to-one manner. All features regarding the arrangement and contour of shape of the interface waveguide apertures 112 accordingly hold also true for the PCB waveguide passages 124 of the respective embodiments in an analogue manner. An EBG structure may or may not be present in any of the embodiments. Further, in a variant, the PCB waveguide may be differently shaped respectively have a different contour and be in particular be smaller as compared to the interface waveguide apertures 112.

Figure 4:
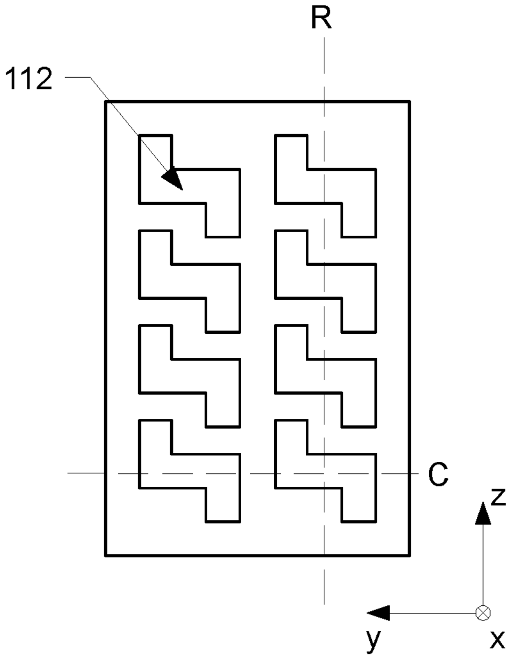
FIG. 4 shows a view corresponding to FIG. 3 for a further embodiment of a waveguide antenna assembly.
Figure 17A:
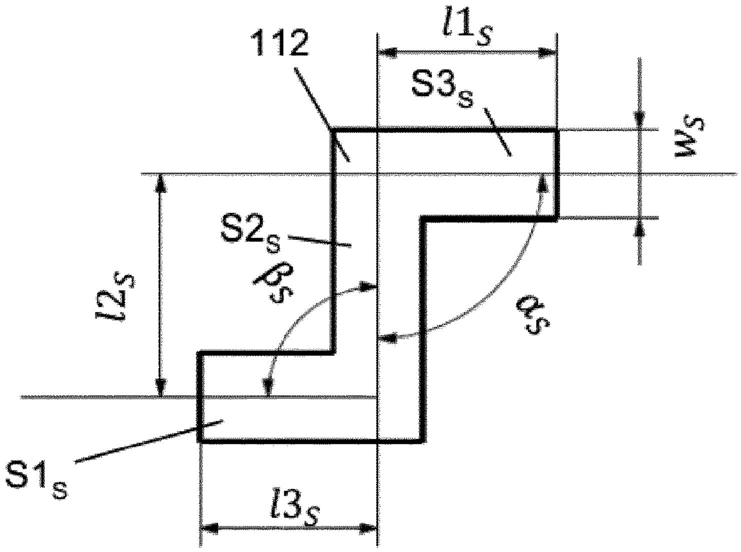
FIG. 17*a* shows an S-shaped contour of an interface waveguide aperture.
Figure 17B:
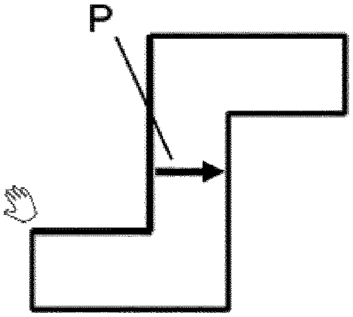
FIG. 17*b* shows a polarization of the E-field vector for the interface waveguide aperture pursuant to FIG. 17*a;*

In the embodiment of FIG. 4, the interface waveguide apertures 112 (and accordingly the PCB waveguide passages 124) have in case an S-shaped contour (see also FIGS. 17*a*, 17*b*). Within the row R, neighboring interface waveguide apertures 112 are somewhat interlaced, while neighboring interface waveguide openings 112 are not interlaced within the columns.

Figure 5:
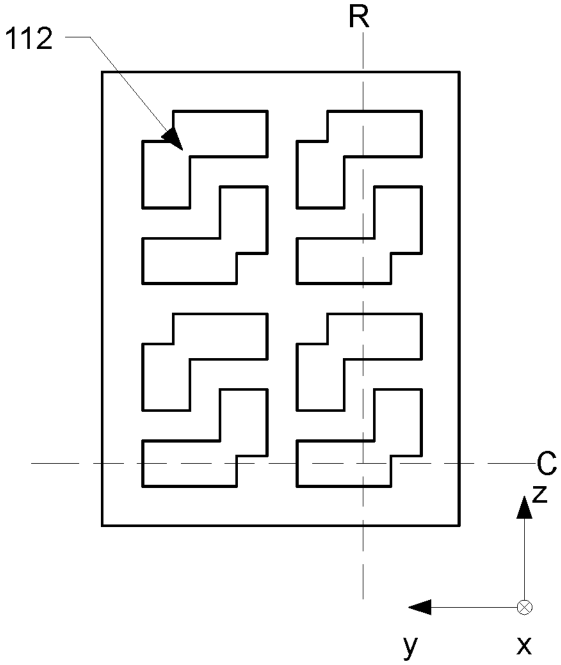
FIG. 5 shows a view corresponding to FIG. 3 for a still further embodiment of a waveguide antenna assembly.

In the following, reference is additionally made to FIG. 5. In this embodiment, the interface waveguide apertures are ridged-L-shaped (see also FIGS. 19*a*, 19*b*, 19*c*). Like in the embodiment of FIG. 4, neighboring interface waveguide apertures 112 are interlaced within the rows R, while they are not interlaced within the columns.

Figure 6:
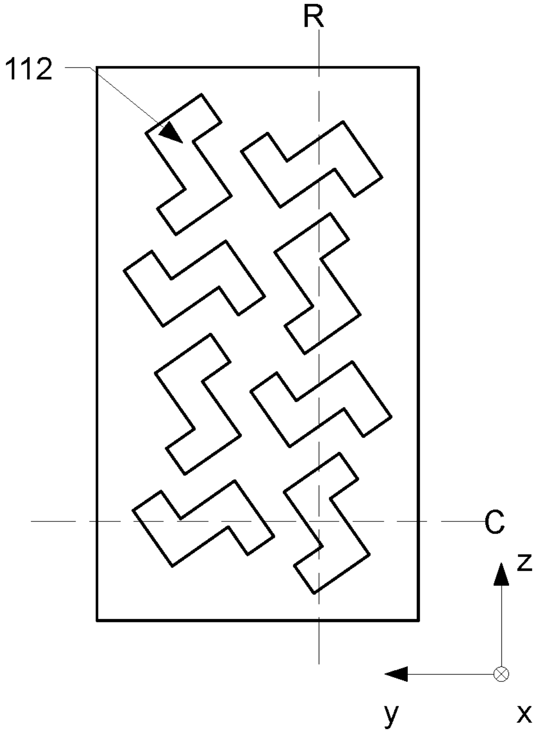
FIG. 6 shows a view corresponding to FIG. 3 for a still further embodiment of a waveguide antenna assembly.

In the following, reference is additionally made to FIG. 6. In this embodiment, the interface waveguide apertures have an S-shaped contour, similar to the embodiment of FIG. 4. In contrast to the latter, however, the interface waveguide apertures 112 are rotated about the x-axis and not aligned with the y- and z-axes are rotated. It can further be seen that each interface waveguide aperture 112 has either of a first or second aperture orientation, with the first and second aperture orientation alternating within each row R and column C. In the shown design, the first and second aperture orientation are rotated with respect to each other by 90°. Other rotational angles, however, may also be used.

Figure 7:
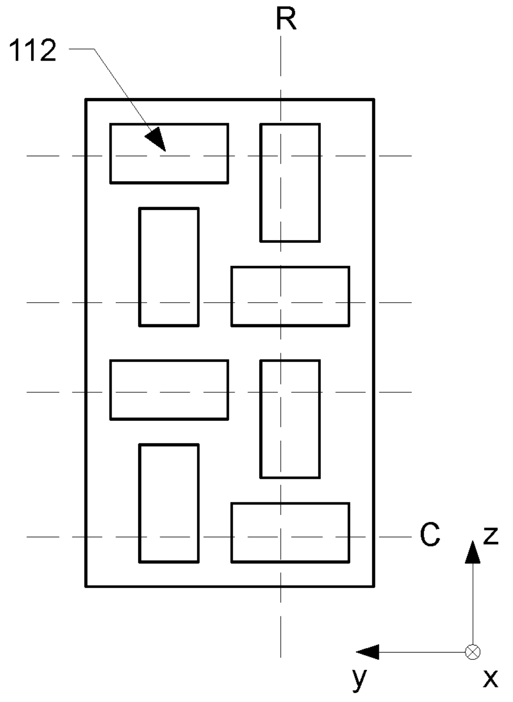
FIG. 7 shows a view corresponding to FIG. 3 for a still further embodiment of a waveguide antenna assembly.

In the following, reference is additionally made to FIG. 7. In this embodiment, the interface waveguide apertures have a rectangular shape. Like in the embodiment of FIG. 6, each interface waveguide aperture 112 has either of a first or a second aperture orientation which are arranged in an alternating manner within each row R and column C. The first and second aperture orientation are rotated by 90° with respect to each other. It is noted that this design results in a non-constant distance between neighboring rows R and/or columns C.

Figure 8:
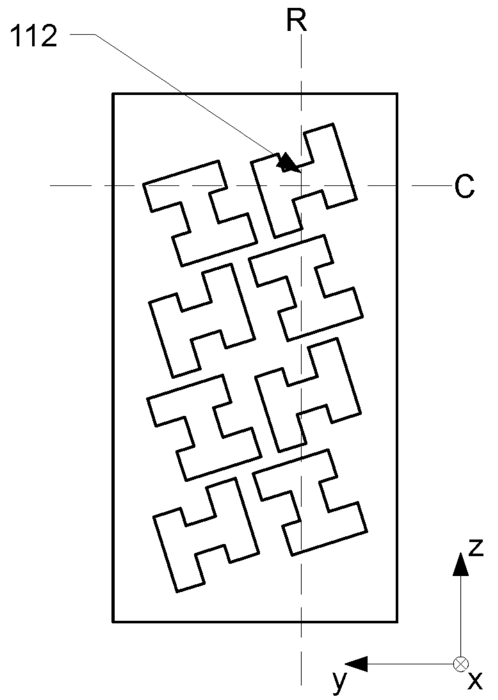
FIG. 8 shows a view corresponding to FIG. 3 for a still further embodiment of a waveguide antenna assembly.

In the following, reference is additionally made to FIG. 8. In this design, the interface waveguide apertures 112 each have a Z-shaped contour (see also FIGS. 18*a*, 18*b*). Also in this design, the interface waveguide apertures 112 have either of a first or aperture orientation which are arranged in an alternating manner within each row R and column C. Like in the embodiment e.g., of FIG. 6, the interface waveguide apertures 112 are not aligned with the axes.

Figure 9:
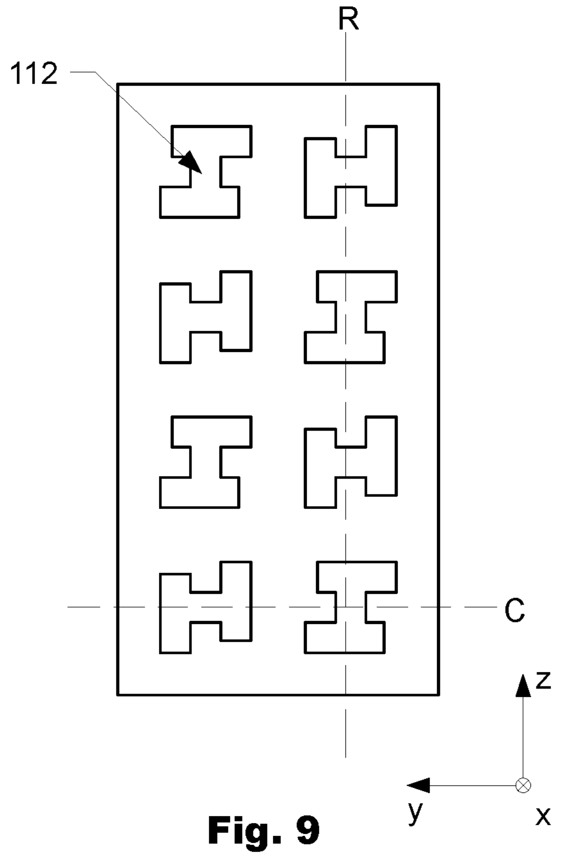
FIG. 9 shows a view corresponding to FIG. 3 for a still further embodiment of a waveguide antenna assembly.
Figure 10:
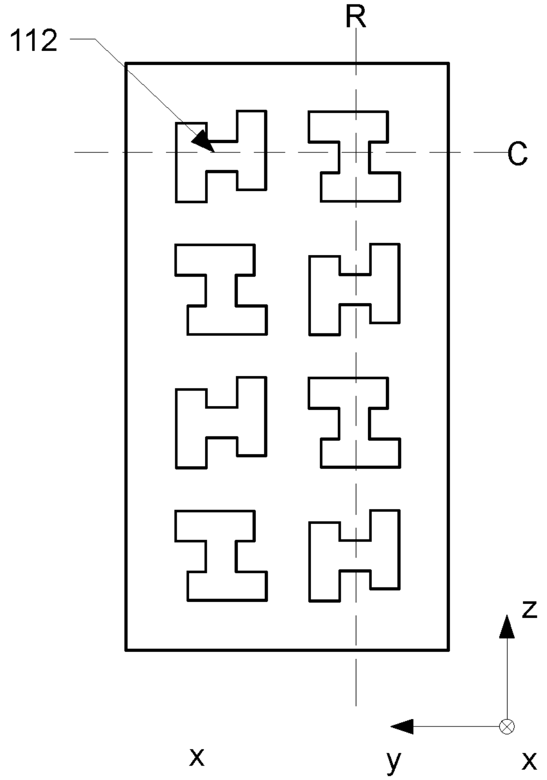
FIG. 10 shows a view corresponding to FIG. 3 for a still further embodiment of a waveguide antenna assembly.

In the following, reference is additionally made to FIG. 9 (see also FIG. 14) and FIG. 10 (see also FIG. 15). The design of FIG. 9 is similar to the design of FIG. 8, in that the interface waveguide apertures 112 each have a Z-shaped contour with in each case either of a first or second aperture orientation in an alternating manner. In contrast to the latter, however, the interface waveguide apertures 112 are aligned with the y- and z-axis. The embodiment of FIG. 10 is similar, but with different orientations of the interface waveguide apertures 112.

Figure 11:
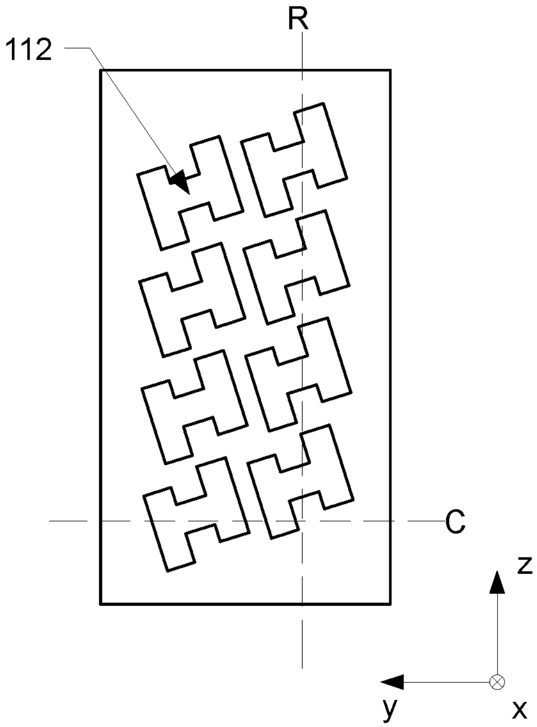
FIG. 11 shows a view corresponding to FIG. 3 for a still further embodiment of a waveguide antenna assembly.
Figure 12:
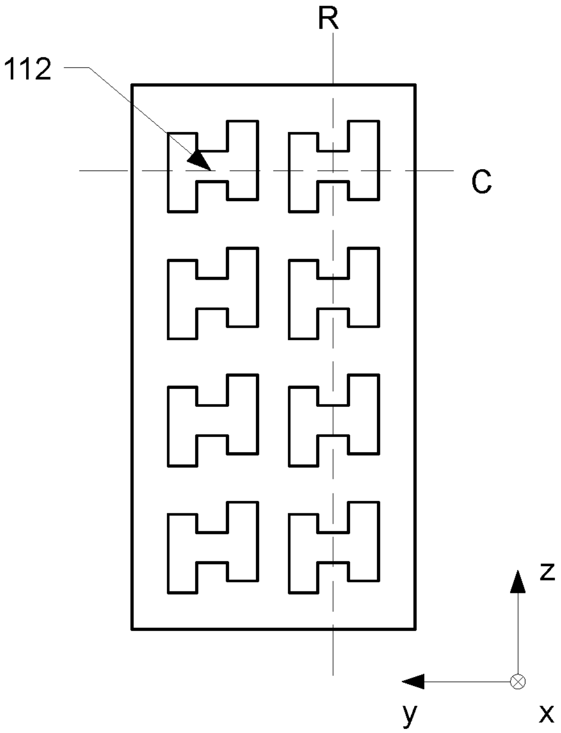
FIG. 12 shows a view corresponding to FIG. 3 for a still further embodiment of a waveguide antenna assembly.

In the following, reference is additionally made to FIG. 11 and FIG. 12. In both designs, the interface waveguide apertures 112 have a Z-shaped contour as discussed before. In these embodiments, however, all interface waveguide apertures 112 have a common orientation which is not aligned with the axis in the embodiment of FIG. 11 and aligned with the axis in FIG. 12.

Figure 13:
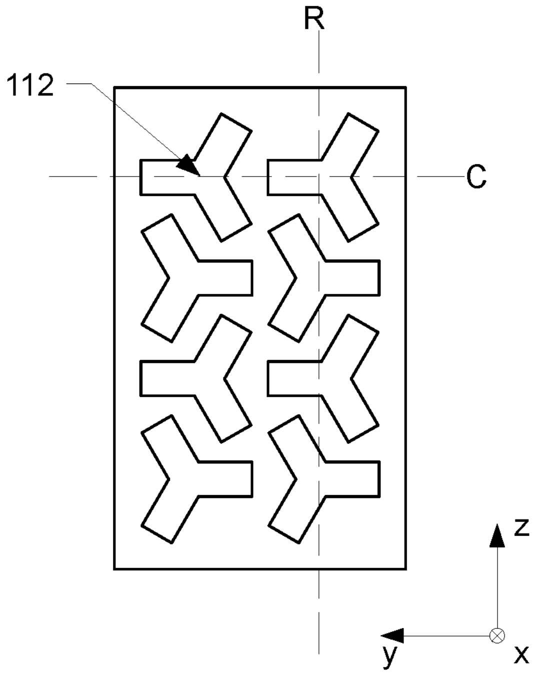
FIG. 13 shows a view corresponding to FIG. 3 for a still further embodiment of a waveguide antenna assembly.

In the following, reference is additionally made to FIG. 13. In this design, the interface waveguide apertures 112 each have a Y-shaped contour with three angled legs (see also FIGS. 16*a*, 16*b*, 16*c*, 16*d*, 16*e*). Like in some before-discussed designs, each interface waveguide aperture 112 has either of a first aperture orientation or a second aperture orientation, with the first and second aperture orientation being rotated with respect to each other by 180° Within each row R, neighboring interface waveguide apertures 112 have an alternating aperture orientation, while they have an identical aperture orientation within each column C: Further, neighboring interface waveguide apertures are interlaced within the rows R, while neighboring interface waveguide apertures 112 are not interlaced within the columns.

Figure 14:
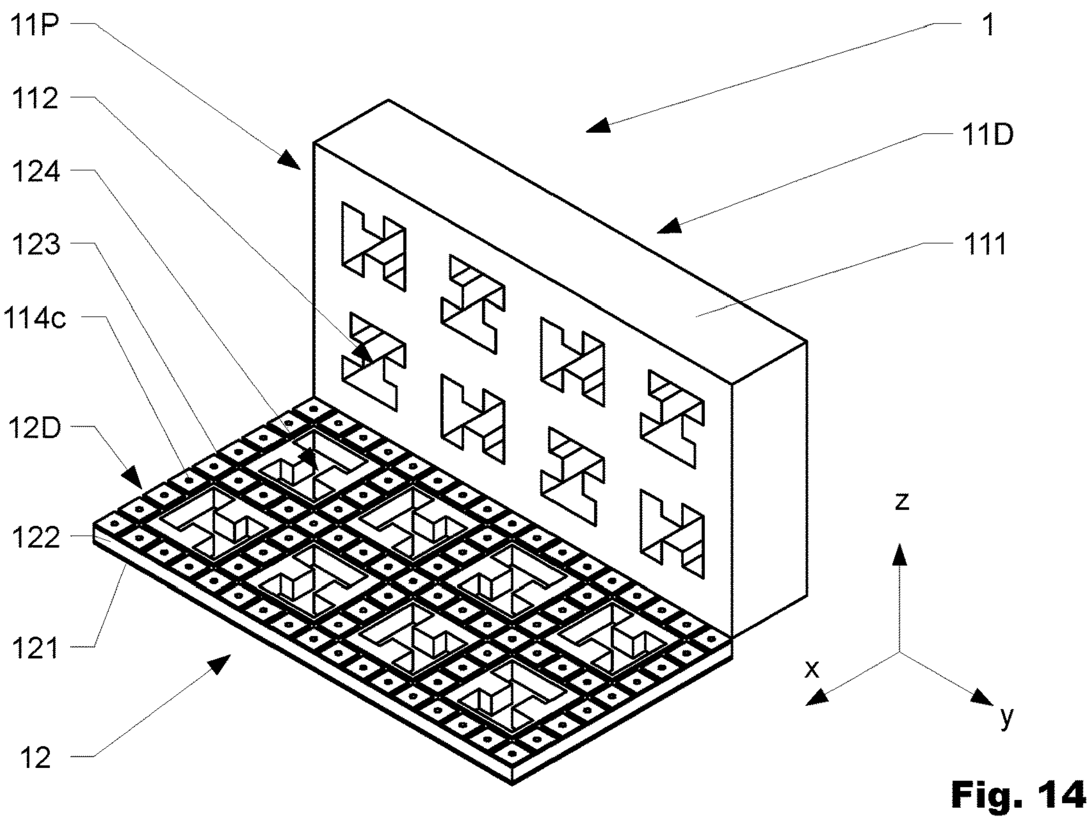
FIG. 14 shows a waveguide antenna assembly in perspective flipped-open view.
Figure 15:
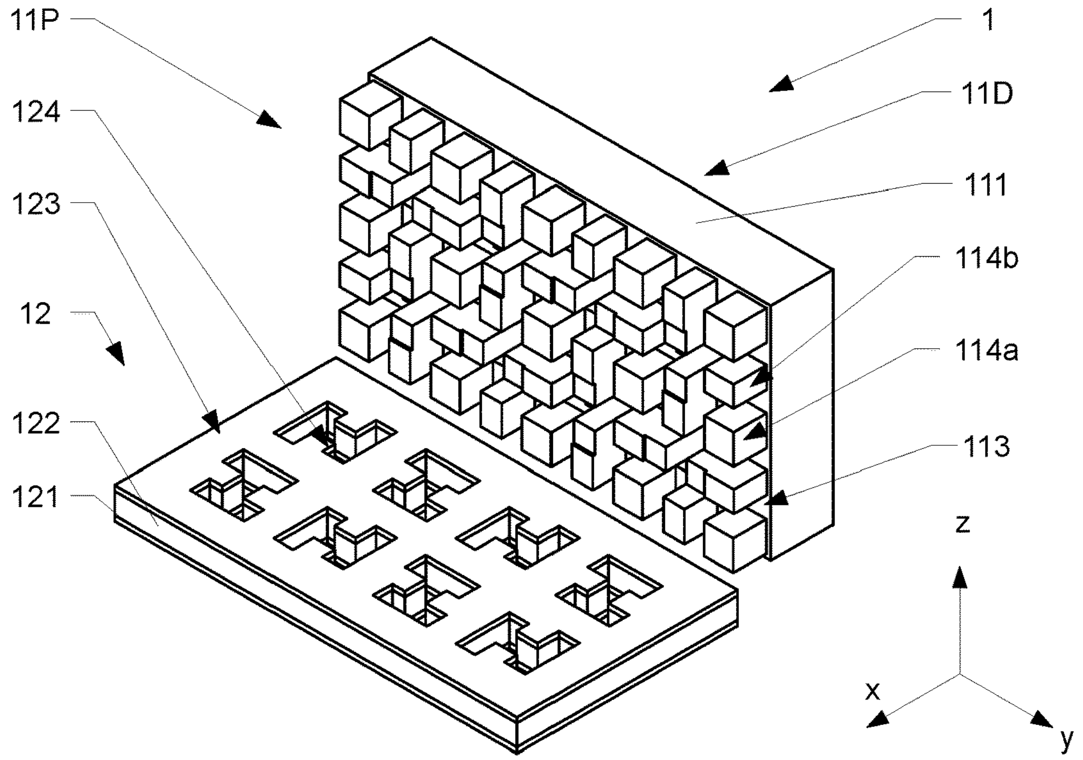
FIG. 15 shows a further waveguide antenna assembly in perspective flipped-open view.

In the following, reference is additionally made to FIG. 14, showing waveguide assembly 1 with an arrangement of Z-shaped interface waveguide apertures 12 pursuant to FIG. 9 in a perspective "flipped-open" view with the PCB 12 being rotated by 90 degrees with respect to the waveguide antenna 11 and touching along a line (aligned with the y-axis). In this design, a PCB EBG structure with mushroom-shaped EBG elements 114 is arranged in the PCB 12, the mushroom-shaped PCB EBG elements 114*c* being arranged around the PCB waveguide openings 124.

In the following, reference is additionally made to FIG. 15, being generally similar to FIG. 14, but showing a design and arrangement of the interface waveguide apertures 112 pursuant to FIG. 10. Further in the embodiment of FIG. 14, the antenna interface structure 111 includes an EBG structure that projects from the interface carrying surface 113 towards the PCB 12. The EBG structure includes a periodic pattern of EBG elements 114*a*, 114*b* in an alternating manner, similar to the embodiment of FIGS. 1, 2.

Figure 16A:
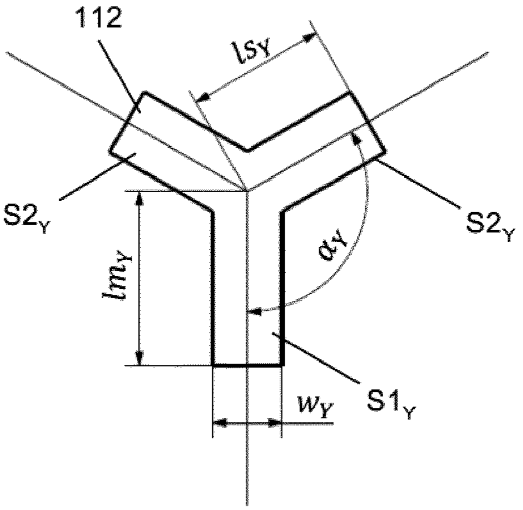
FIG. 16*a* shows a Y-shaped contour of an interface waveguide aperture.

In the following, reference is additionally made to FIGS. 16*a*, 16*b*, 16*c*, 16*d*, 16*e*, illustrating the dimensioning of a Y-shaped interface waveguide aperture 112 and the effect of various design parameters on the polarization. As indicated in FIG. 16*a*, the Y-shaped interface waveguide aperture 112 has three elements or segments, namely a base segment Sly of length $lm_Y$, and two arms $S2_Y$ of length $lS_Y$ each. The arm segments $S2_Y$ project from the base segment $S1_Y$ in a symmetrical manner in each case with a base-arm angle $\alpha_Y$. The elements have in each case an element width $w_Y$.

The base-aria angle $\alpha_Y$ should favorably be in a range of 90° to 150, $\alpha_Y \in [90°, 150°]$. For the relation of the element width $w_Y$ and the wave length λ, the relation $w_Y \leq \lambda/3$ should hold true and similarly $lS_Y$, $lm_Y \in (0, 3\lambda/2)$.

Figure 16B:
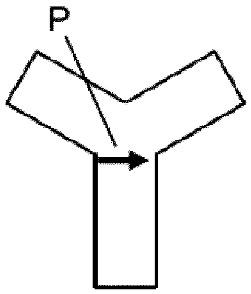
FIG. 16*b* shows a polarization of the E-field vector for the interface waveguide aperture pursuant to FIG. 16*a;*
Figure 16C:
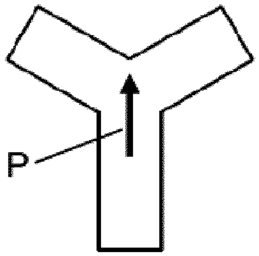
FIG. 16*c* shows a further polarization of the E-field vector for the interface waveguide aperture pursuant to FIG. 16*a;*
Figure 16D:
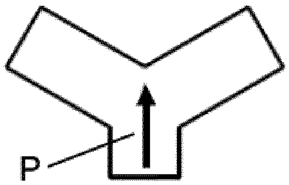
FIG. 16*d* shows a further polarization of the E-field vector for the interface waveguide aperture pursuant to FIG. 16*a;*
Figure 16E:
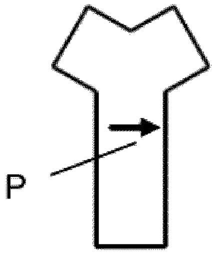
FIG. 16*e* shows a further polarization of the E-field vector for the interface waveguide aperture pursuant to FIG. 16*a;*

For a similar length $lm_Y$ of the base segment $S1_Y$ and length $lS_Y$ of the arm segments $S2_Y$, i.e., $lm_Y \approx lS_Y$, two mutually orthogonal polarizations P are possible (FIGS. 16*b*, 16*c*). For the length $lm_Y$ of the base segment $S1_Y$ being small as compared to the length $lS_Y$ of the arm segments $S2_Y$, i.e., $lm_Y \ll lS_Y$, one polarization is possible with the E-vector being parallel to the base (FIG. 16*d*). For the length $lS_Y$ of the arm segments $S2_Y$ being small as compared to the length $lm_Y$ of the base segment $S1_Y$, i.e., $lS_Y \ll lm_Y$, one polarization is possible with the E-vector being perpendicular to the base (FIG. 16*e*).

In the following, reference is additionally made to FIG. 17*a*, 17*b*, illustrating the dimensioning of an S-shaped interface waveguide aperture 112 and the resulting polarization.

As indicated in FIG. 17*a*, the S-shaped interface waveguide aperture 112 has three elements or segments $S1_S$, $S2_S$, $S2_S$ of lengths $l1_S$, $l2_S$, $l3_S$, with the first segment $S1_S$ being connected to the second segment $S2_S$ with an angle $\alpha_S$, and the second segment $S2_S$ being connected to the third segment $S3_S$ with an angle $\beta_S$, thereby forming a polygonal line. For a symmetric S-shape, the angles $\alpha_S$, $\beta_S$ may be equal, which, however is not essential. The segments $S1_S$, $S2_S$, $S2_S$ have in each case an element width $w_S$. For the relation of the element width $w_S$ and the wavelength λ, the relation $w_S \leq \lambda/3$ should hold true. In a typical design, the angles $\alpha_S$, $\beta_S$ may be 90°, i.e., right angled. This, however, is not mandatory, generally angles between 60° and 150° may be used, $\alpha_S$, $\beta_S \in [60°, 150°]$. It is noted that the shapes could also be mirrored with respect to the y- or z-axis (axes respectively directions in the plane of the interface carrying surface). The same holds true for other shapes.

Regarding the segment length, equal segment lengths are generally favorable $l1_S = l2_S = l3_S$. For equal segment lengths, $l1_S$, $l2_S$, $l3_S \approx \lambda/4$ may be used. For different segment lengths, $l1_S + l2_S + l3_S \leq \frac{3}{4} \cdot \lambda$ may be used, but the sum of the segment lengths, $l1_S + l2_S + l3_S$ may also be slightly larger. The resulting polarization P will be transverse to the middle segment, as indicated in FIG. 17*b*

Figure 18A:
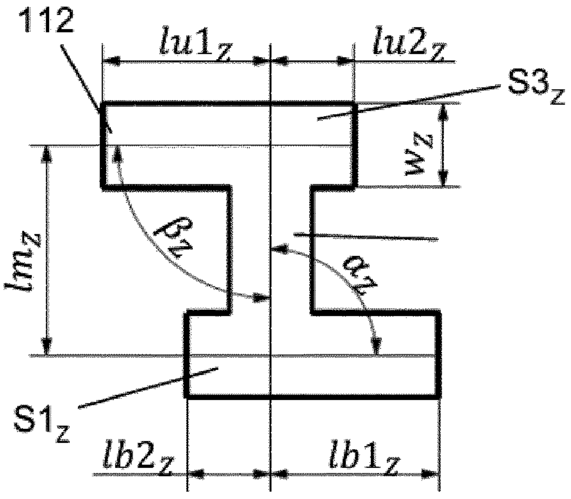
FIG. 18*a* shows a Z-shaped contour of an interface waveguide aperture.
Figure 18B:
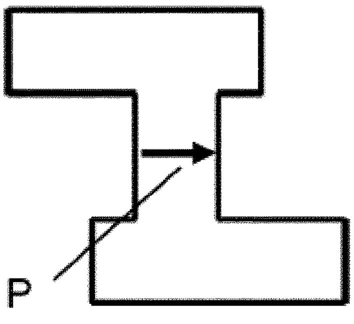
FIG. 18*b* shows a polarization of the E-field vector for the interface waveguide aperture pursuant to FIG. 18*a;*

In the following, reference is additionally made to FIG. 18*a*, 18*b*, illustrating the dimensioning of a Z-shaped interface waveguide aperture 112 and the resulting polarization.

As indicated in FIG. 18*a*, the Z-shape is similar to the S-shape as discussed before in that it has generally three segments $S1_Z$, $S2_Z$, $S3_Z$. In contrast to the S-shape, however, the middle segment $S2_Z$ is not connected to an end of the other outer segments $S1_Z$, $S3_Z$. Instead, the outer segments $S1_Z$, $S3_Z$ extend to both sides from the middle segment $S2_Z$ with lengths $lu1_Z$, $lu2_Z$, $lb1_Z$, $lb2_Z$ as referenced in FIG. 18*a*. The angles $\alpha_Z$, $\beta_Z$ under which the outer segments $S1_Z$, $S3_Z$ are connected to the middle segment $S2_Z$ are general equal and $\alpha_Z = \beta_Z = 90°$. Other angels may in principle also be used, but are more complex in manufacture. For the relation of the element width $w_Z$ and the wavelength λ, the relation $w_Z \leq \lambda/3$ should hold true.

Regarding the segment length, the relation $lu1_Z = lb1_Z = lm_Z$ ideally holds true and may approximately correspond to a quarter wavelength, $lu1_Z$, $lb1_Z$, $lm_Z$Æ$\lambda/4$. For the other segment parts, $lu2_Z$, $lb2_Z$, the relation $lu2_Z$, $lb2_Z \in [0, \lambda/4]$ should hold true. It is noted that all four segment parts $lu1_Z$, $lu2_Z$, $lb1_Z$, $lb2_Z$ may have an equal length of about λ/4. If the relation $lu1_Z = lb1_Z = lm_Z$ does not hold true, the condition $lu1_Z + lb1_Z + lm_Z \leq \frac{3}{4} \cdot \lambda$, and/or $lu1_Z + lb1_Z + lm_Z \approx \frac{3}{4} \cdot \lambda$, should be met. The resulting polarization P will be transverse to the middle segment, as indicated in FIG. 18*b*.

In the following, reference is additionally made to FIGS. 19*a*, 19*b*, 19*c*, illustrating the dimensioning of an L-shaped or ridged-L-shaped interface waveguide aperture 112 and the resulting polarization.

The L-shaped and the ridged-L-shaped design are generally similar, in that they both have two connected segments $S1_L$, $S2_L$ of lengths $l1_L$, $l2_L$ that form a polygonal line. L-shaped design (FIG. 19*a*) differs from the ridged-L-shaped design (FIG. 19*b*) in that the latter has a ridge 112' of dimensions $r1_L$, $r2_L$, in the outer connecting corner of the segments $S1_L$, $S2_L$.

In a typical design, the $\alpha_L$ between the segments $S1_L$, $S2_L$ may be 90°. However, angles between 90° and 150° may be used, $\alpha_S$, $\beta_S \in [90°, 150°]$. The length $l1_L$, $l2_L$ of the segments $S1_L$, $S2_L$ may be equal or different with $l1_L + l2_L \leq 3/4 \cdot \lambda$, and/or $l1_L$, $l2_L \approx 3/4 \cdot \lambda$.

If a ridge 112' is present, the combined length $l1_L + l2_L$ may be reduced, in particular to $l1_L + l2_L \approx 2/3 \cdot \lambda$ or similar.

The resulting polarization P will be diagonal as indicated in FIG. 19*c* for both the L-shape and the ridged-L-shape.

It is noted that some deviation is possible without deviating from the general designed operation of the illustrated contours. In particular, straight lines respectively contour segments may be somewhat bent or curved and/or edges may be rounded.

Figure 20A:
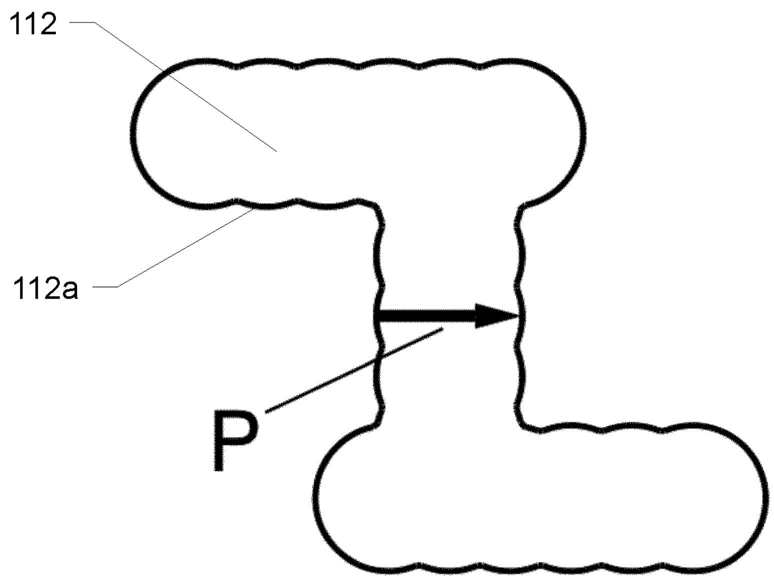
FIG. 20*a* shows a further contour of an interface waveguide aperture.

In the following, reference is additionally made to FIG. 20*a*, 2*b*, illustrating designs for interface waveguide apertures 112 with non-straight contour segments respectively rounded edges. Apart from the modifications as described in the following, FIGS. 20*a*, 20*b* generally correspond to FIG. 18*b*.

Figure 20B:
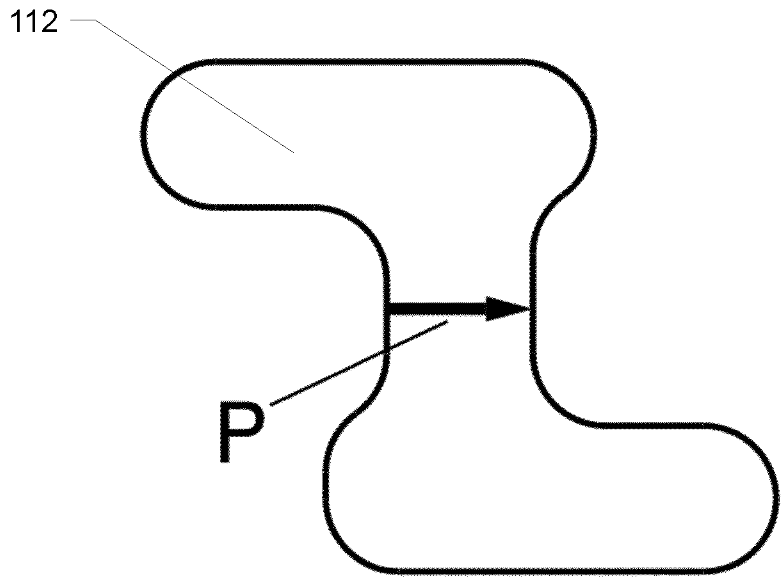
FIG. 20*b* shows a still further contour of an interface waveguide aperture.

In both the design of FIG. 20*a* and FIG. 20*b*, the contour of the shown interface waveguide aperture 112 is generally Z-shaped as in FIGS. 18*a*, 18*b*, resulting in substantially identical characteristics and following the same design rules. In the design as shown in FIG. 20*a*, the straight contour segments are replaced by a plurality of circular arc segments 112*a* that form, in combination, a closed and approximately Z-shaped contour. The circular arc segments 112*a* are favorably of identical diameter. Interface waveguide apertures 112 according to FIG. 20*a* may for example be manufactured by drilling multiple holes with the same drill in an overlapping manner between neighboring drillings. As compared to straight contour segments, the manufacture is simplified.

In the design as shown in FIG. 20*b*, the contour segments are generally straight, but the joints between in each case adjacent contour segments are rounded.

Figure 21:
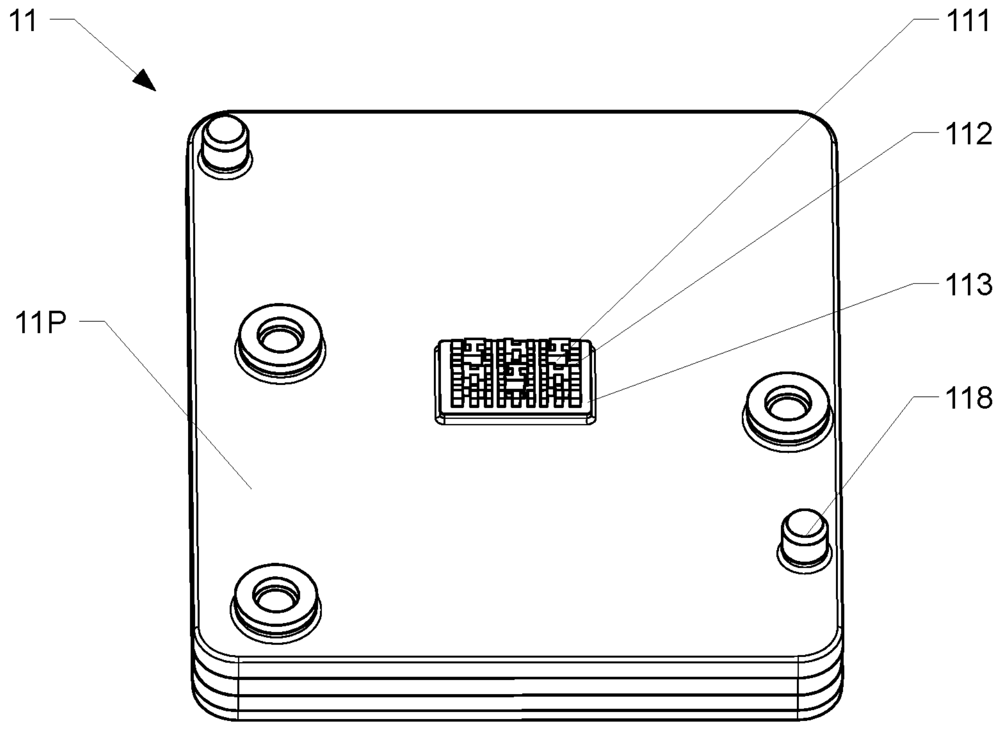
FIG. 21 shows an embodiment of a waveguide antenna in an angled perspective view on the antenna proximal side.
Figure 22:
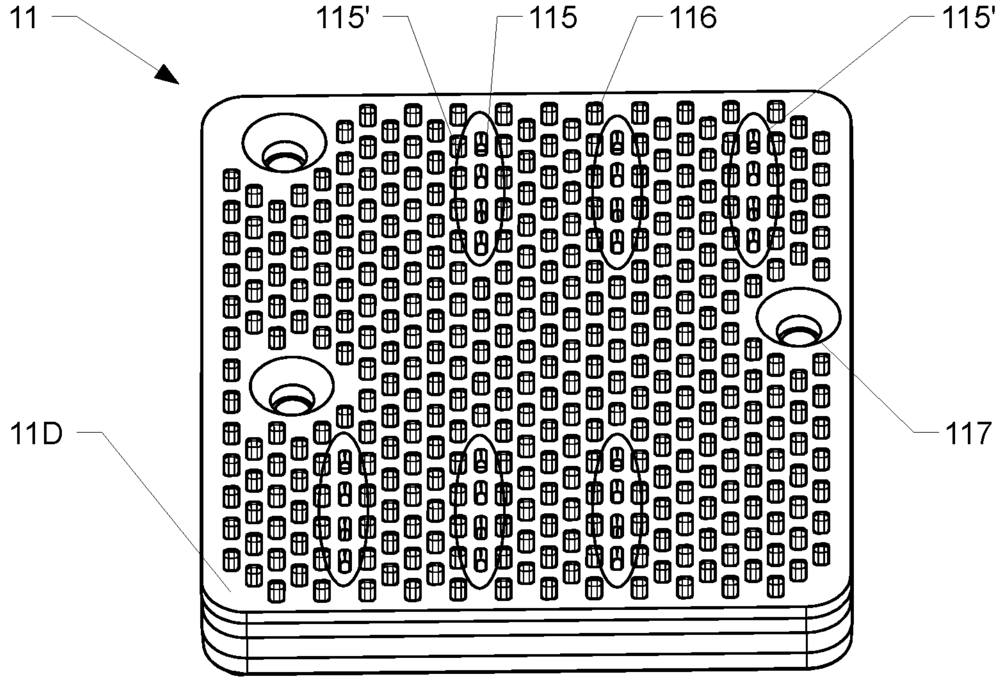
FIG. 22 shows the waveguide antenna of FIG. 21 in an angled perspective view on the antenna distal side.

In the following, reference is additionally made to FIGS. 21, 22, showing a further embodiment of a waveguide antenna 11 in an angled perspective view on the antenna proximal side 11P (FIG. 21) and the antenna distal side 11D (FIG. 22), respectively. It can be seen that the antenna proximal surface of the antenna proximal side 11P is generally planar and parallel to the antenna distal surface of the antenna distal side 11D.

In a central region of the antenna proximal surface, the generally planar interface carrying surface is 113 with the antenna interface structure 111 is arranged. The interface carrying surface 113 is parallel to but displaced with respect to the surrounding peripheral antenna proximal surface in proximal direction. The antenna interface structure is designed according to a before-described embodiments, with interface waveguide apertures and an EBG-structure.

In the antenna distal surface at the antenna distal side 11D a plurality of waveguide openings 115 is arranged. In the shown design, the waveguide openings 115 are arranged in six waveguide opening groups 115' (indicated by ellipses), with each waveguide opening group 115' comprising four waveguide openings 115 arranged consecutively in a line.

In the area between the waveguide opening groups 115', a plurality of scattering elements 116 is arranged. The scattering elements 116 form, in combination, a scattering surface. The scattering surface enhances the antenna performance by at least partly eliminating multiple reflections resulting e.g., in automotive radar applications from a radome as described further below or a bumper. Electromagnetic waves respectively rays impacting a scattering element 116 are at least partly reflected by the respective scattering element and thereby separated into a first and second secondary ray that cancel each outer out.

For mounting the waveguide antenna 11 to a PCB, screw holes 117 are foreseen. For alignment purposes, exemplary two alignment pins 118 are provided and project from the antenna proximal side.

Figure 23:
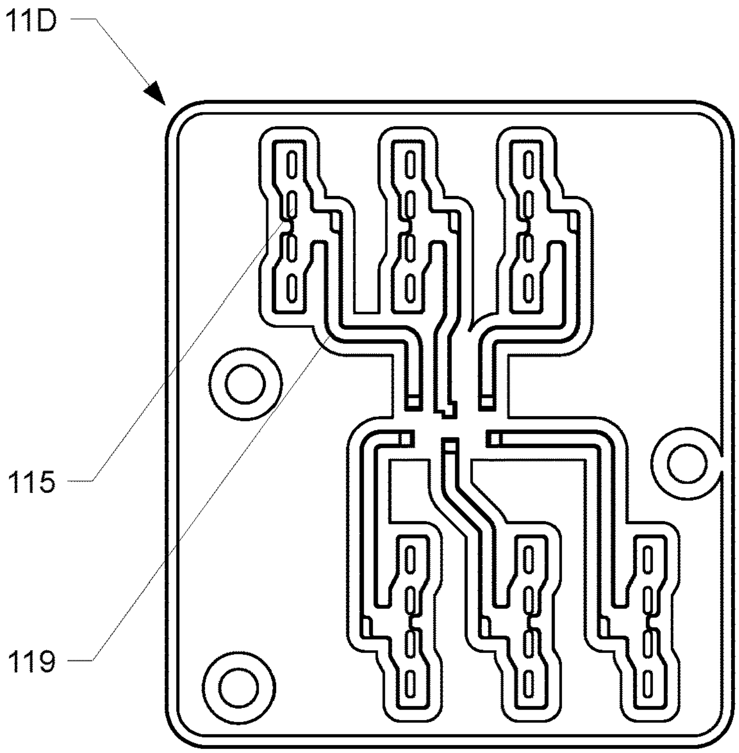
FIG. 23 shows a distal antenna layer of the waveguide antenna of FIG. 21, 22.
Figure 24:
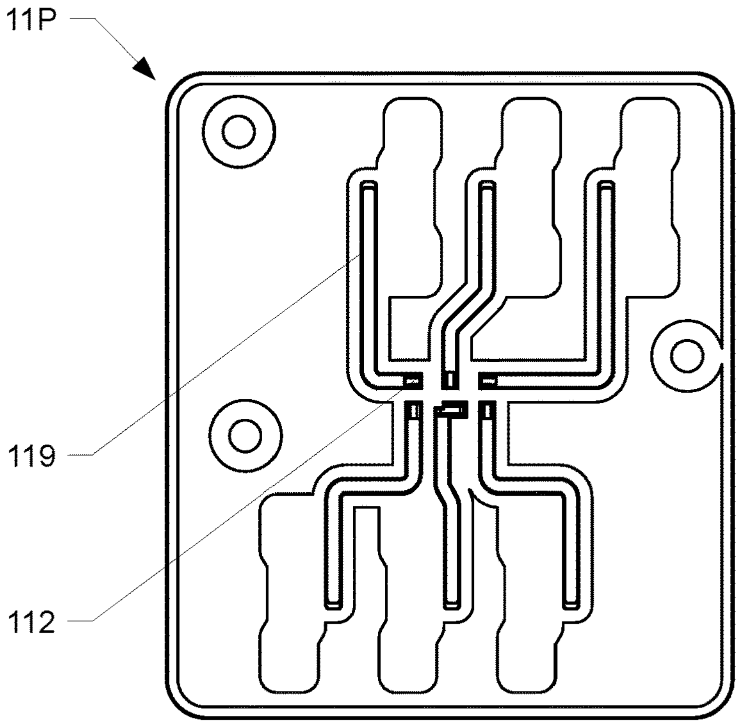
FIG. 24 shows a proximal antenna layer of the waveguide antenna of FIG. 21, 22.

In the following, reference is additionally made to FIGS. 23, 24, illustrating the internal design of the waveguide antenna 11. In the shown design, the waveguide antenna 11 is realized by a stack of two layers, namely a proximal antenna layer 11*p* with the antenna proximal side and an antenna distal layer 11*d* with the antenna distal side 11D. FIG. 23 shows a view on the distal antenna layer 11*d* with a viewing direction from proximal towards distal. Similarly, FIG. 24 shows the proximal antenna layer 11*p* with a viewing direction from distal towards proximal. FIGS. 23, 24, show the waveguide channel structure 119 via which the waveguide openings 119 and interface waveguide apertures 112 are coupled as explained before.

Figure 25:
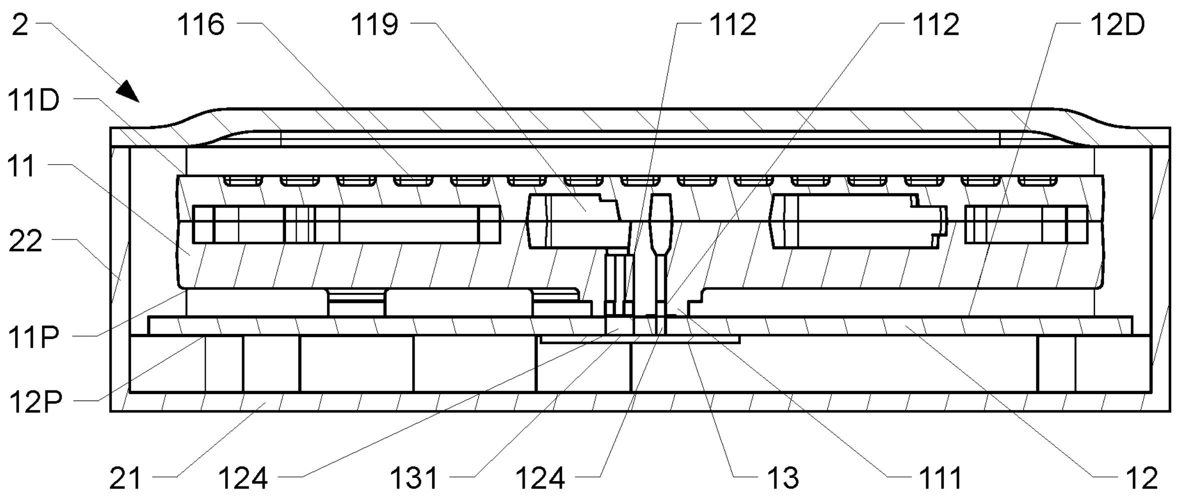
FIG. 25 shows an embodiment of an automotive radar system.

In the following, reference is additionally made to FIG. 25, illustrating an automotive radar system 2 in a sectional view. The automotive radar system 2 comprises a housing with a generally box-shaped casing 21 and a radome 22 as cover. Inside the casing 21, a waveguide antenna assembly with a waveguide antenna 11 as described before, e.g., according to the embodiment illustrated in FIGS. 21 to 24, and a PCB 112 are arranged. The waveguide antenna 11 is arranged such that the antenna proximal side with waveguide openings 115 (not visible in FIG. 25) and scattering elements 116 faces the radome.

On the PCB proximal side 12P, i.e., the side facing away from the waveguide antenna 11, a semiconductor component 13 in form of a Monolithic Microwave Integrated Circuit (MMIC) is arranged. At its distal side, the MMIC comprises a number of electromagnetic signal launches 131, corresponding to the number of interface waveguide apertures 112. Each electromagnetic signal launcher 131 is electromagnetically coupled with a respective associated interface waveguide aperture 112 via a respective associated PCB waveguide passage 124 of the PCB 12. Optionally, further components, e.g., semiconductor components, may be arranged on the PCB proximal side 12P and/or PCB distal side 12D.

Figure 26:
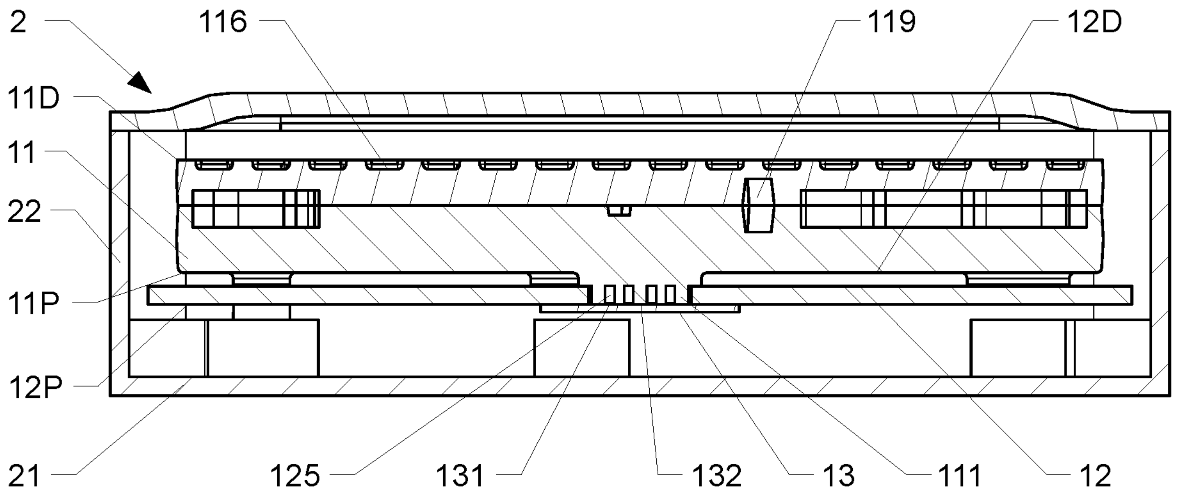
FIG. 26 shows a further embodiment of an automotive radar system.

In the following, reference is additionally made to FIG. 26, illustrating a further embodiment of an automotive radar system 2 similar to FIG. 25. In the design of FIG. 26, however, no individual PCB waveguide passages 124 are present. Instead, the antenna interface structure 111 projects through a PCB coupling cut-out 125 of the PCB 12. The antenna interface structure 111 may contact the MMIC at its distal side directly or via a layer of conductive adhesive 132.

Figure 27:
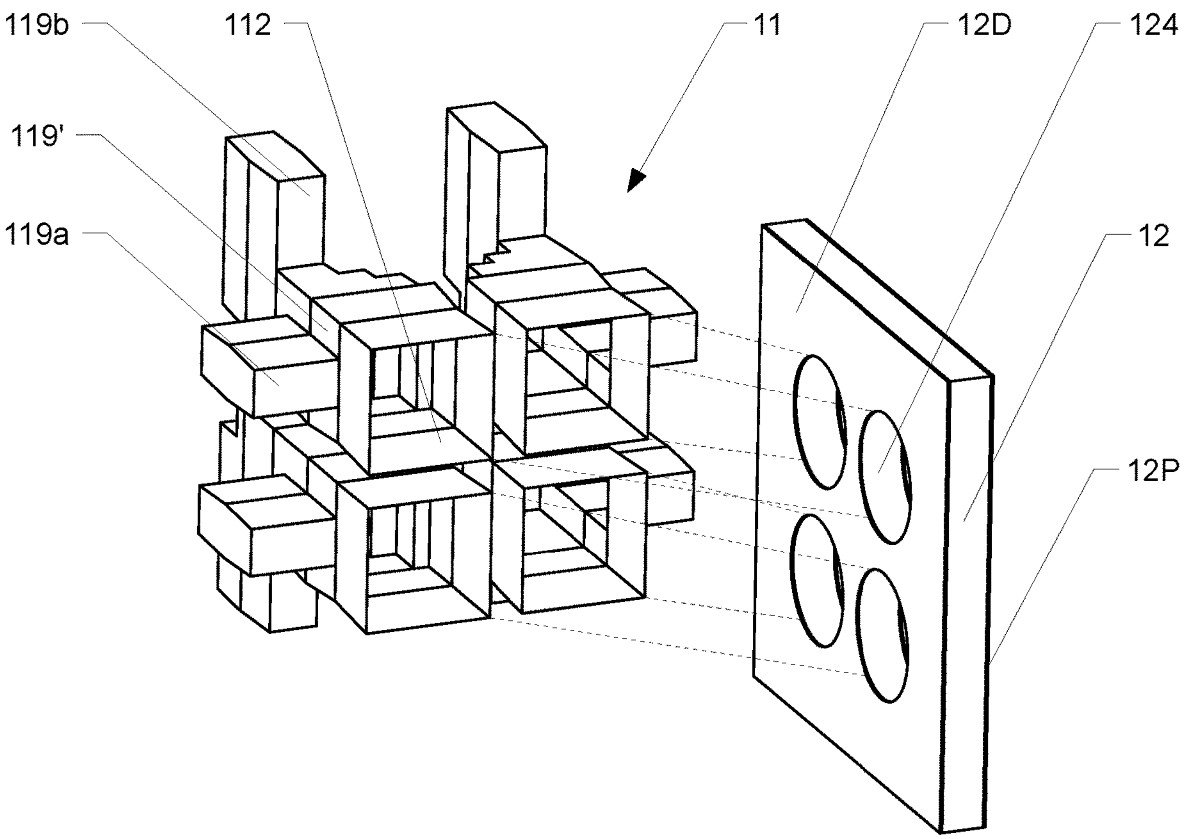
FIG. 27 shows a further embodiment of a part of a waveguide antenna assembly in a perspective view.
Figure 28:
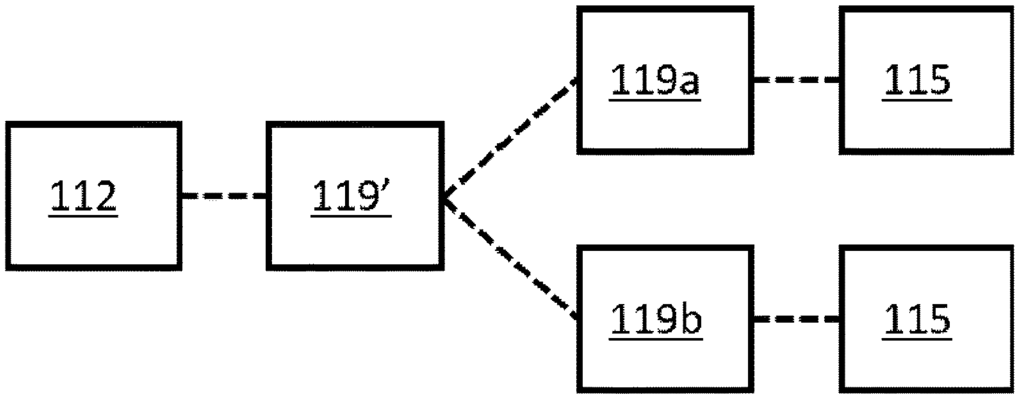
FIG. 28 shows an illustration of the electromagnetic structure corresponding to FIG. 27.

In the following, reference is additionally made to FIG. 27, FIG. 28, illustrating part of a further embodiment of a waveguide antenna assembly 1. FIG. 27 shows a schematic perspective view. In the interest of clarity, only a number of functionally relevant features of the waveguide antenna 11 is shown as explained below. Further, the PCB 12 is shown flipped away from the waveguide antenna 11.

In the embodiment of FIG. 27, the waveguide antenna 11 includes a number of orthomode transducers 119'. Each orthomode transducer 119' is associated and electromagnetically coupled with an associated interface waveguide aperture 112 in a one-to-one manner. Further, two branches 119*a*, 119 of the waveguide channel structure 119 extend from each orthomode transducer 119. A first branch 119*a* electromagnetically couples with one or more of the antenna waveguide openings 115, and a second branch 119*b* electromagnetically couples with one or more further waveguide openings 115. The corresponding electromagnetic coupling structure between an interface waveguide aperture 112, orthomode transducer 119', branches 119*a*, 119*b* of the waveguide channel structure 119, and antenna waveguide openings is illustrated in FIG. 28.

Further, it can be seen that the contour of the interface waveguide apertures 112 is in this embodiment square, while the cross section of the PCB waveguide passages 124 (and accordingly the contour of the PCB waveguide passages 124 in the PCB distal plane 12D) is circular.

The invention claimed is:

1. A waveguide antenna having at least two signal channels, the waveguide antenna having an antenna distal side and an antenna proximal side, wherein a number of waveguide openings for at least one of transmitting electromagnetic signals to and receiving electromagnetic signals from an environmental space is arranged at the antenna distal side, the waveguide antenna including an antenna interface structure for connecting the waveguide antenna to at least one of a printed circuit board and a semiconductor component, the antenna interface structure being arranged at the antenna proximal side, the antenna interface structure including a number of interface waveguide apertures, the number of interface waveguide apertures being arranged in an interface carrying surface and coupled with the number of waveguide openings via a waveguide channel structure arranged within the waveguide antenna, wherein the interface carrying surface extends transverse to a normal axis, the normal axis extending between proximal and distal, wherein each interface waveguide aperture is coupled with at least one associated waveguide opening such that the respective interface waveguide aperture and the associated at least one waveguide opening are offset with respect to each other transverse to the normal axis, wherein each interface waveguide aperture and at least one thereto coupled waveguide opening are configured for at least one of transmitting and receiving electromagnetic signals with respective polarizations rotated against each other, and wherein the interface waveguide apertures are designed and arranged such that at least two neighboring interface waveguide apertures are interlaced with each other.

2. The waveguide antenna according to claim 1, wherein the interface waveguide apertures have at least one of the following shaped contours: Y-shaped, Z-shaped, L-shaped, ridged-L-shaped, S-shaped or N-shaped.

3. The waveguide antenna according to claim 1, wherein the interface waveguide apertures have in each case an identical contour.

4. The waveguide antenna according to claim 1, wherein the interface waveguide apertures are arranged in a pattern of rows and columns.

5. The waveguide antenna according to claim 4, wherein the interface waveguide apertures out of the following: within a row within a column or within a row and a column, have in each case an identical aperture orientation.

6. The waveguide antenna according to claim 1, wherein the interface waveguide apertures have in each case either of a first aperture orientation or a second aperture orientation different from the first aperture orientation, wherein interface waveguide apertures having the first aperture orientation are arranged with interface apertures having the second aperture orientation in an alternating manner.

7. The waveguide antenna according to claim 1, wherein the antenna interface structure includes an electromagnetic band gap (EBG) structure, the electromagnetic band gap structure projecting from the interface carrying surface.

8. The waveguide antenna according to claim 1, the waveguide antenna further including a number of orthomode transducers, the orthomode transducer being electromagnetically arranged between the number waveguide openings and the number of interface waveguide apertures.

9. The waveguide antenna according to claim 8, wherein an orthomode transducer of the number of orthomode transducers is associated and electromagnetically coupled with an associated interface waveguide aperture in a one-to-one manner.

10. The waveguide antenna assembly, the waveguide antenna assembly including a waveguide antenna according to claim 1, the waveguide antenna assembly further including a printed circuit board, the printed circuit board having a printed circuit board proximal side and a printed circuit board distal side, wherein the waveguide antenna is mounted on the printed circuit board distal side.

11. The waveguide antenna assembly-according to claim 10, wherein the printed circuit board includes a printed circuit board interface structure with a number of printed circuit board waveguide passages, the printed circuit board waveguide passages each extending through the printed circuit board between the printed circuit board proximal side and the printed circuit board distal side, wherein the printed circuit board waveguide passages are in in each case aligned with a respective interface waveguide aperture.

12. The waveguide antenna assembly according to claim 11, wherein each printed circuit board waveguide passage has a cross section that is different from the contour of the associated interface waveguide aperture.

13. The waveguide antenna assembly-according to claim 11, wherein the waveguide antenna assembly further including a semiconductor component, the semiconductor component being mounted on the printed circuit board proximal side, the semiconductor component including a number of electromagnetic signal launchers, the number of electromagnetic signal launchers corresponding to the number of printed circuit board waveguide passages, wherein the printed circuit board waveguide passages are in in each case aligned with a respective electromagnetic signal launcher in a one-to-one manner.

14. The waveguide antenna assembly according to claim 10, wherein the printed circuit board includes a printed circuit board coupling cut-out, the printed circuit board coupling cut-out extending between the printed circuit board distal side and the printed circuit board proximal side, the antenna interface structure projecting into or through the printed circuit board coupling cut-out from the printed circuit board distal side towards the printed circuit board proximal side.

15. The waveguide antenna assembly according to claim 14, wherein the waveguide antenna assembly further including a semiconductor component, the semiconductor component being mounted on the printed circuit board proximal side, the semiconductor component including a number of electromagnetic signal launchers, the number of electromagnetic signal launchers corresponding to the number of interface waveguide apertures, wherein the interface waveguide apertures are in each case aligned with a respective electromagnetic signal launcher in a one-to-one manner.

16. The waveguide antenna assembly according to claim 15, wherein the antenna interface structure directly contacts the semiconductor component.

17. The waveguide antenna assembly according to claim 16, wherein the antenna interface structure and the semiconductor component are coupled via a layer of conductive adhesive, the layer of conductive adhesive being arranged between the antenna interface structure and the semiconductor component.

18. The waveguide antenna assembly according to claim 10 wherein a printed circuited board electromagnetic band gab structure, in particular an electromagnetic band gap structure having mushroom-shaped electromagnetic band gap elements, is arranged on or within the PCB.

19. A waveguide antenna having at least two signal channels, the waveguide antenna having an antenna distal side and an antenna proximal side, wherein a number of waveguide openings for at least one of transmitting electromagnetic signals to and receiving electromagnetic signals from an environmental space is arranged at the antenna distal side, the waveguide antenna including an antenna interface structure for connecting the waveguide antenna to at least one of a printed circuit board and a semiconductor component, the antenna interface structure being arranged at the antenna proximal side, the antenna interface structure including a number of interface waveguide apertures, the number of interface waveguide apertures being arranged in an interface carrying surface and coupled with the number of waveguide openings via a waveguide channel structure arranged within the waveguide antenna, wherein the interface carrying surface extends transverse to a normal axis, the normal axis extending between proximal and distal, wherein each interface waveguide aperture is coupled with at least one associated waveguide opening such that the respective interface waveguide aperture and the associated at least one waveguide opening are offset with respect to each other transverse to the normal axis, wherein each interface waveguide aperture and at least one thereto coupled waveguide opening are configured for at least one of transmitting and receiving electromagnetic signals with respective polarizations rotated against each other, and wherein the interface waveguide apertures are in each case designed to enable at least one of a simultaneous and an alternative transferring of at least two electromagnetic signals of different polarization.

20. A waveguide antenna having at least two signal channels, the waveguide antenna having an antenna distal side and an antenna proximal side, wherein a number of waveguide openings for at least one of transmitting electro-magnetic signals to and receiving electromagnetic signals from an environmental space is arranged at the antenna distal side, the waveguide antenna including an antenna interface structure for connecting the waveguide antenna to at least one of a printed circuit board and a semiconductor component, the antenna interface structure being arranged at the antenna proximal side, the antenna interface structure including a number of interface waveguide apertures, the number of interface waveguide apertures being arranged in an interface carrying surface and coupled with the number of waveguide openings via a wave-guide channel structure arranged within the waveguide antenna, wherein the inter-face carrying surface extends transverse to a normal axis, the normal axis extending between proximal and distal, wherein each interface waveguide aperture is coupled with at least one associated waveguide opening such that the respective interface waveguide aperture and the associated at least one waveguide opening are offset with respect to each other transverse to the normal axis, wherein each interface waveguide aperture and at least one thereto coupled waveguide opening are configured for at least one of transmitting and receiving electromagnetic signals with respective polarizations rotated against each other, and wherein the interface waveguide apertures are designed and arranged such that at least two neighboring interface waveguide apertures have different aperture orientations.

* * * * *